United States Patent
Jiang et al.

(10) Patent No.: US 12,063,544 B2
(45) Date of Patent: Aug. 13, 2024

(54) MESSAGE TRANSMITTING METHOD AND APPARATUS, AND CONTROL METHOD AND APPARATUS THEREFOR

(71) Applicant: DATANG MOBILE COMMUNICATIONS EQUIPMENT CO., LTD., Beijing (CN)

(72) Inventors: Yong Jiang, Beijing (CN); Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 253 days.

(21) Appl. No.: 17/294,419

(22) PCT Filed: Nov. 14, 2019

(86) PCT No.: PCT/CN2019/118612
§ 371 (c)(1),
(2) Date: May 17, 2021

(87) PCT Pub. No.: WO2020/098760
PCT Pub. Date: May 22, 2020

(65) Prior Publication Data
US 2022/0060937 A1 Feb. 24, 2022

(30) Foreign Application Priority Data
Nov. 16, 2018 (CN) .......................... 201811367980.3

(51) Int. Cl.
*H04W 28/02* (2009.01)
*H04W 48/18* (2009.01)
*H04W 84/04* (2009.01)

(52) U.S. Cl.
CPC ....... *H04W 28/0289* (2013.01); *H04W 48/18* (2013.01); *H04W 84/042* (2013.01)

(58) Field of Classification Search
CPC ............. H04W 28/0289; H04W 48/18; H04W 84/042
See application file for complete search history.

(56) References Cited

U.S. PATENT DOCUMENTS

2017/0196028 A1 7/2017 Iwai
2021/0029628 A1* 1/2021 Kim ...................... H04W 48/18

FOREIGN PATENT DOCUMENTS

CN 102244916 A 11/2011
CN 102802217 A 11/2012
(Continued)

OTHER PUBLICATIONS

Sharp, "Clarification on back-off timer upon PLMN change", 3GPP TSG-CT WG1 Meeting #112bis, Vilnius (Lithuania), Oct. 15-19, 2018, total 22 pages, C1-186958.
(Continued)

*Primary Examiner* — Wayne H Cai
(74) *Attorney, Agent, or Firm* — Kilpatrick Townsend & Stockton LLP

(57) ABSTRACT

Disclosed are a message transmitting method and apparatus, and a control method and apparatus therefor for solving the problem of whether a congestion control back-off timer still running in a first PLMN is still valid in a second PLMN after a UE moves from the first PLMN to the second PLMN. The message transmitting method comprises: when it is necessary to establish a new PDU session after a UE moves from a first PLMN to a second PLMN, determining indication information of a network side; and when the UE needs to transmit a session management (SM) message in the second PLMN, determining, according to the indication information, whether a congestion control back-off timer of the UE in the first PLMN is still valid in the second PLMN.

20 Claims, 11 Drawing Sheets

(56) References Cited

FOREIGN PATENT DOCUMENTS

| CN | 103517325 | A  | 1/2014 |
|----|-----------|----|--------|
| CN | 106416354 | A  | 2/2017 |
| CN | 107005823 | A  | 8/2017 |
| CN | 108093433 | A  | 5/2018 |
| WO | 2013004151 | A1 | 1/2013 |
| WO | 2018168966 | A1 | 9/2018 |

OTHER PUBLICATIONS

Nokia et al., "Updating Configured NSSAI when HPLMN subscription to S-NSSAIs changes", 3GPP TSG SA WG2#127bis, May 28-Jun. 1, 2018, Newport Beach, USA, total 3 pages, S2-185399.
Sharp, "Congestion control upon PLMN change", 3GPP TSG-CT WG1 Meeting #111, Osaka (Japan), May 21-25, 2018, total 15 pages, C1-183759.
Nokia et al., "Mapping of S-NSSAIs between PLMNs", 3GPP TSG-CT WG1 Meeting #112bis, Vilnius (Lithuania), Oct. 15-19, 2018, total 62 pages, C1-186546.
Ericsson et al., "Reporting PS Data Off status change when SM back off timer is running", 3GPP TSG-SA WG2 Meeting #129, Dongguan, China, Oct. 15-19, 2018, total 5 pages, S2-1810128.
Korean Intellectual Property Office, Office Action Issued in Application No. 10-2021-7017904, dated Aug. 24, 2023, 7 pages.
Huawei et al., "Back-off timer handling for UE with AC11-15", 3GPP TSG-CT WG1 Meeting #109, Montreal (Canada), Feb. 26-Mar. 2, 2018, total 9 pages, C1-181457.
European Patent Office, office action issued in Application No. 19884060.5, Mar. 18, 2024, Netherlands, 6 pages.
Korean Intellectual Property Office, Written Decision on Registration in Application No. 10-2021-7017904, May 27, 2024, 7 pages.

* cited by examiner

MESSAGE TRANSMITTING METHOD AND APPARATUS, AND CONTROL METHOD AND APPARATUS THEREFOR

CROSS REFERENCE TO RELATED APPLICATIONS

This application is a US National Stage of International Application No. PCT/CN2019/118612, filed on Nov. 14, 2019, which claims priority to the Chinese Patent Application No. 201811367980.3, filed to CNIPA on Nov. 16, 2018 and entitled "MESSAGE SENDING METHOD AND APPARATUS, AND CONTROL METHOD AND APPARATUS THEREFOR", the entire contents of which are incorporated herein by reference.

FIELD

The present application relates to the field of communication, in particular to a message transmitting method and apparatus, and a control method and apparatus therefor.

BACKGROUND

At present, it is specified that, when a user equipment (UE) moves to a new public land mobile network (PLMN), processing ways of a congestion control back-off timer of a data network name (DNN) and/or single network slice selection assistance information (S-NSSAI) in a second PLMN are shown below.

(1) When the PLMN is changed, timers T3396 of a DNN and the second PLMN are running, the UE allows a packet data unit (PDU) SESSION ESTABLISHMENT REQUEST message with the same DNN or without the DNN to be transmitted in the first PLMN.

(2) When the PLMN is changed, timers T3584 of the S-NSSAI, the DNN and the second PLMN are running, the UE allows a PDU SESSION ESTABLISHMENT REQUEST message with the same S-NSSAI and DNN to be transmitted in the first PLMN.

(3) When the PLMN is changed, timers T3396 of a piece of S-NSSAI and the second PLMN are running, the UE allows a PDU SESSION ESTABLISHMENT REQUEST message with the S-NSSAI to be transmitted in the first PLMN.

On the other hand, at present, it is specified:

in the UE, the starting and stopping of a 5GS session management timer T3396 based on the DNN are both based on DNN granularity.

Based on the above, the characteristic of each PDU session is not taken into consideration in a processing way of a cross-PLMN congestion control back-off timer of a DNN and/or slice proposed at present, to bring unnecessary signaling overhead. For example, when the UE receives a congestion control back-off timer of a DNN in a home PLMN (HPLMN), after the UE moves to a first PLMN and needs to establish a PDU session of the DNN, the congestion control back-off timer of the current DNN is still running. If the UE transmits a session management (SM) message without taking the congestion control back-off timer of the DNN into consideration, it is possible that a PDU SESSION ESTABLISHMENT REQUEST is still refused by a session management function (SMF) of the HPLMN due to a home-routed PDU session in the HPLMN when the UE transmits the PDU SESSION ESTABLISHMENT REQUEST, and thus, the unnecessary signaling overhead is increased. Conversely, if the UE does not transmit a PDU SESSION ESTABLISHMENT REQUEST message due to the consideration on a congestion control back-off timer in a previous PLMN when moving to another PLMN, it is possible that a chance that a new PDU session is established in time is missed because the PDU session established in the first PLMN by the UE is a local breakout PDU session.

SUMMARY

Embodiments of the present application provide a message transmitting method and apparatus, and a control method and apparatus therefor for solving the problem of whether a congestion control back-off timer still running in a first PLMN is still valid in a second PLMN after UE moves from the first PLMN to the second PLMN, to avoid the problem that a SM message transmitted by the UE is refused due to the congestion control back-off timer or the SM message may not be transmitted in time due to incorrect consideration on the congestion control back-off timer.

At a terminal side, an embodiment of the present application provides a method for transmitting a message, including:

when determining to establish a new PDU session after a UE moves from a first PLMN to a second PLMN, determining indication information of a network side; and when the UE needs to transmit a SM message in the second PLMN, determining, according to the indication information, whether a congestion control back-off timer of the UE in the first PLMN is still valid in the second PLMN.

By using the method, when it is necessary to establish the new PDU session after the UE moves from the first PLMN to the second PLMN, the indication information of the network side is determined; and when the UE needs to transmit the SM message in the second PLMN, it is determined, according to the indication information, whether the congestion control back-off timer of the UE in the first PLMN is still valid in the second PLMN, to solve the problem of whether the congestion control back-off timer still running in the first PLMN is still valid in the second PLMN after the UE moves from the first PLMN to the second PLMN, and further avoiding the problem that the SM message transmitted by the UE is refused due to the congestion control back-off timer or the SM message may not be transmitted in time due to incorrect consideration on the congestion control back-off timer.

In one embodiment, the indication information is used for indicating:

whether a PDU session corresponding to a DNN is required to be anchored to a home PLMN (HPLMN); and/or, whether S-NSSAI is S-NSSAI of a HPLMN or S-NSSAI of a visiting PLMN (VPLMN).

In one embodiment, the indication information indicating whether the PDU session corresponding to the DNN is required to be anchored to the HPLMN is determined in one of following ways that:

the network side indicates, according to a UE route selection policy (URSP), whether the PDU session corresponding to the DNN is required to be anchored to the HPLMN;

or, indication information of the DNN corresponding to the PDU session is specified when the network side transmits a non-access-stratum (NAS) message to the UE.

In one embodiment, when the NAS message carries a congestion control back-off timer associated with the DNN, the indication information of the DNN is specified by an access and mobility management function (AMF) for transmitting a downlink NAS TRANSPORT (DL NAS TRANSPORT) message.

In one embodiment, the indication information of the DNN corresponding to the current PDU session is specified in a PDU session determination process by a SMF, or, the indication information of the DNN is specified when the congestion control back-off timer associated with the DNN is carried.

In one embodiment, the congestion control back-off timer associated with the DNN is: a congestion control back-off timer of the DNN, the S-NSSAI or a [S-NSSAI, DNN] combination for the PDU session corresponding to the current DNN.

In one embodiment, when the network side specifies a congestion control back-off timer associated with the current S-NSSAI to the UE, it is indicated whether the current S-NSSAI is the S-NSSAI of the HPLMN or the S-NSSAI of the VPLMN accessed at present.

In one embodiment, when the NAS message includes the congestion control back-off timer associated with the S-NSSAI, relevant information of the S-NSSAI is indicated by the AMF for transmitting the DL NAS TRANSPORT message or the SMF for transmitting a SM message.

In one embodiment, the congestion control back-off timer associated with the S-NSSAI is a congestion control back-off timer of the S-NSSAI or a [S-NSSAI, DNN] combination for a PDU session corresponding to the S-NSSAI.

In one embodiment, when a congestion control back-off timer of a DNN of the UE in the first PLMN is running while the UE needs to transmit a SM message of the DNN in the second PLMN:
  when the received information indicates that the PDU session corresponding to the DNN is required to be anchored to a HPLMN, the congestion control back-off timer of the DNN is determined to be still valid when the UE transmits a SM message for the PDU session corresponding to the DNN after the PLMN is changed, and the UE is allowed to transmit the SM message for the PDU session corresponding to the DNN until the congestion control back-off timer expires;
  when the received information indicates that an anchor point of the DNN is allowed to be in a VPLMN, the congestion control back-off timer of the DNN is determined to be invalid when the SM message for the PDU session corresponding to the DNN is transmitted after the PLMN is changed; or
  when the received DNN, corresponding to the congestion control back-off timer of the DNN, in the PDU SESSION ESTABLISHMENT message transmitted by the UE, is an empty PDU session, the congestion control back-off timer of the DNN is determined to be invalid in a new PLMN after the PLMN is changed.

In one embodiment, when the UE moves from the first PLMN to the second PLMN, the congestion control back-off timer of the S-NSSAI of the UE in the first PLMN is running, and the UE needs to transmit a SM message of the S-NSSAI in the second PLMN:
  when the received NAS message of the congestion control back-off timer of the S-NSSAI indicates that the S-NSSAI is a S-NSSAI slice of the HPLMN, if a network indicates that a DNN is required to be anchored to the HPLMN, the congestion control back-off timer of the S-NSSAI is required to be taken into consideration when the UE transmits a SM message for a PDU session corresponding to the S-NSSAI and the DNN after the PLMN is changed; and if the network indicates that the DNN is a DNN of which an anchor point is in a VPLMN, the congestion control back-off timer of the S-NSSAI is not required to be taken into consideration when the UE transmits the SM message for the PDU session corresponding to the S-NSSAI and the DNN after the PLMN is changed;
  when the received NAS message of the congestion control back-off timer of the S-NSSAI indicates that the S-NSSAI is a S-NSSAI slice of a current VPLMN, the congestion control back-off timer of the S-NSSAI is not required to be taken into consideration when the UE transmits the SM message for the PDU session after the PLMN is changed; or
  when the received S-NSSAI, corresponding to the congestion control back-off timer of the S-NSSAI, in a PDU SESSION ESTABLISHMENT message transmitted by the UE, is an empty PDU session, the congestion control back-off timer of the S-NSSAI is not required to be taken into consideration after the PLMN is changed.

In one embodiment, when the UE moves from the first PLMN to the second PLMN, a congestion control back-off timer of a [S-NSSAI, DNN] combination of the UE in the first PLMN is running, and the UE needs to transmit a SM message of the S-NSSAI and the DNN in the second PLMN:
  when a network indicates that the received DNN of the congestion control back-off timer of the [S-NSSAI, DNN] combination is a DNN required to be anchored to the HPLMN, the S-NSSAI in the [S-NSSAI, DNN] combination is also the S-NSSAI slice of the HPLMN, and the congestion control back-off timer of the [S-NSSAI, DNN] combination is required to be taken into consideration when the UE transmits a SM message corresponding to the [S-NSSAI, DNN] combination after the PLMN is changed;
  when the network indicates that the received DNN of the congestion control back-off timer of the [S-NSSAI, DNN] combination is a DNN of which an anchor point is allowed to be in a VPLMN, the S-NSSAI in the [S-NSSAI, DNN] combination is also the S-NSSAI slice of the VPLMN, and the congestion control back-off timer of the [S-NSSAI, DNN] combination is not required to be taken into consideration when the UE transmits the SM message corresponding to the [S-NSSAI, DNN] combination after the PLMN is changed; or
  when at least one of the received DNN and S-NSSAI, corresponding to the congestion control back-off timer of the [S-NSSAI, DNN] combination, in a PDU SESSION ESTABLISHMENT message transmitted by the UE, is an empty PDU session, the congestion control back-off timer of the [S-NSSAI, DNN] combination is not required to be taken into consideration after the PLMN is changed.

Accordingly, at a network side, an embodiment of the present application provides a control method for transmitting a message, including:
  determining indication information, and when determining to establish a new PDU session after a UE moves from a first PLMN to a second PLMN, and the UE needs to transmit a SM message in the second PLMN, it is determined, according to the indication information, whether a congestion control back-off timer of the UE in the first PLMN is still valid in the second PLMN; and
  transmitting the indication information to the UE.

In one embodiment, the indication information is used for indicating:
whether a PDU session corresponding to a DNN is required to be anchored to a HPLMN; and/or,
whether S-NSSAI is S-NSSAI of a HPLMN or S-NSSAI of a VPLMN.

In one embodiment, the indication information indicating whether the PDU session corresponding to the DNN is required to be anchored to the HPLMN is transmitted in one of the following ways that:
the network side indicates, according to a URSP, whether the PDU session corresponding to the DNN is required to be anchored to the HPLMN;
or, indication information of the DNN corresponding to the PDU session is specified when the network side transmits a NAS message to the UE.

In one embodiment, when the NAS message carries a congestion control back-off timer associated with the DNN, the indication information of the DNN is specified by an AMF for transmitting a DL NAS TRANSPORT message.

In one embodiment, the indication information of the DNN corresponding to a current PDU session is specified in a PDU session determination process by a SMF, or, the indication information of the DNN is specified when the congestion control back-off timer associated with the DNN is carried.

In one embodiment, the congestion control back-off timer associated with the DNN is: a congestion control back-off timer of the DNN, the S-NSSAI or a [S-NSSAI, DNN] combination for the PDU session corresponding to the current DNN.

In one embodiment, when the network side specifies a congestion control back-off timer associated with the current S-NSSAI to the UE, it is indicated whether the current S-NSSAI is the S-NSSAI of the HPLMN or the S-NSSAI of the VPLMN accessed at present.

In one embodiment, when the NAS message includes the congestion control back-off timer associated with the S-NSSAI, relevant information of the S-NSSAI is indicated by the AMF for transmitting the DL NAS TRANSPORT message or the SMF for transmitting a SM message.

In one embodiment, the congestion control back-off timer associated with the S-NSSAI is a congestion control back-off timer of the S-NSSAI or a [S-NSSAI, DNN] combination for a PDU session corresponding to the S-NSSAI.

Another embodiment of the present application provides computing equipment, including a memory and a processor, and the memory is used for storing a program instruction, and the processor is used for calling the program instruction stored in the memory and executing any one of the above-mentioned methods according to an obtained program.

A further embodiment of the present application provides a computer storage medium. The computer storage medium stores a computer-executable instruction, and the computer-executable instruction is used for enabling a computer to execute any one of the above-mentioned methods.

At a terminal side, an embodiment of the present application provides another apparatus for transmitting a message, including:
a first device, configured to, when determining to establish a new PDU session after a UE moves from a first PLMN to a second PLMN, determine indication information of a network side; and
a second device, configured to, when the UE needs to transmit a SM message in the second PLMN, determine, according to the indication information, whether a congestion control back-off timer of the UE in the first PLMN is still valid in the second PLMN.

At a network side, an embodiment of the present application provides another control apparatus for transmitting a message, including:
a determining device, configured to determine indication information, and when determining to establish a new PDU session after a UE moves from a first PLMN to a second PLMN, and the UE needs to transmit a SM message in the second PLMN, it is determined, according to the indication information, whether a congestion control back-off timer of the UE in the first PLMN is still valid in the second PLMN; and
a transmitting device, configured to transmit the indication information to the UE.

BRIEF DESCRIPTION OF THE DRAWINGS

In order to describe the embodiments of the present application more clearly, the accompanying drawings required for describing the embodiments will be briefly introduced below. Apparently, the accompanying drawings in the following description show only some embodiments of the present application.

DETAILED DESCRIPTION OF THE EMBODIMENTS

Figure 1:
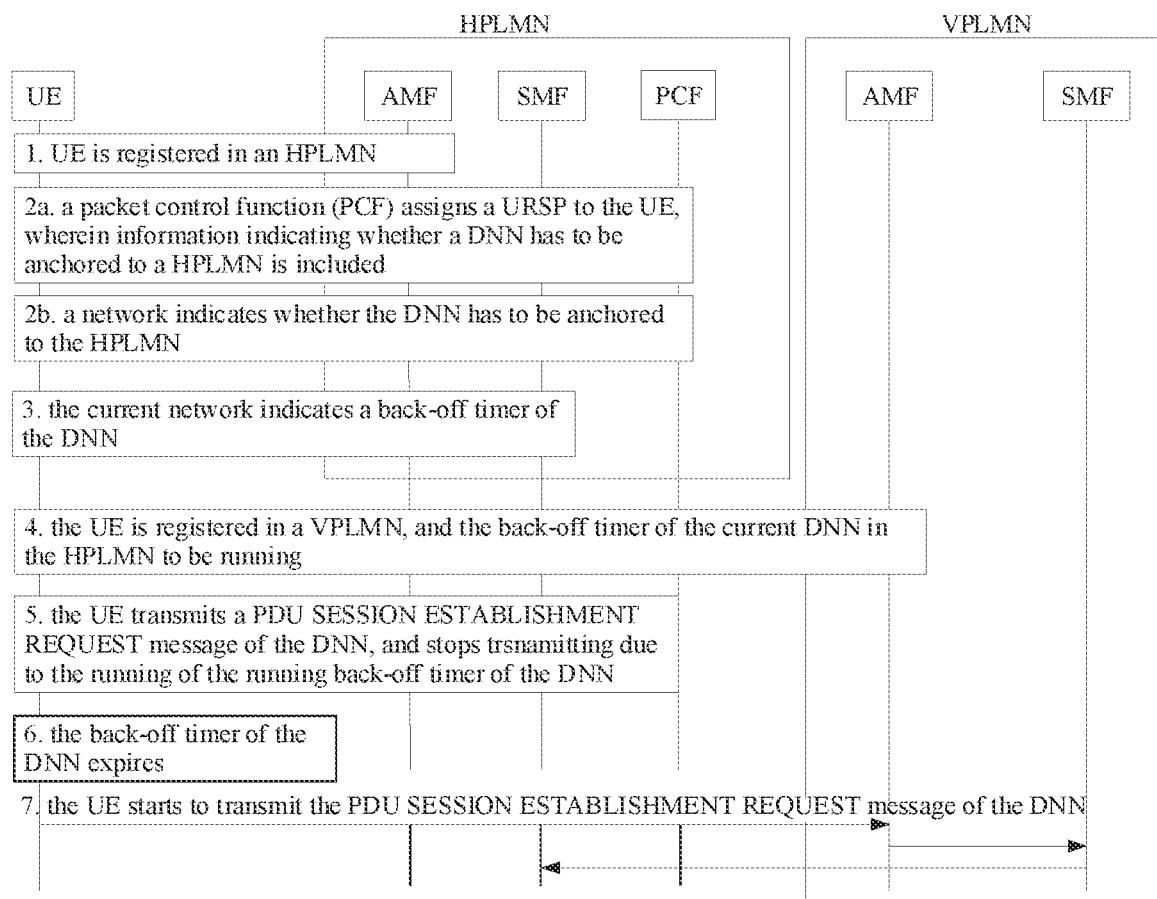
FIG. 1 is a schematic diagram showing a processing flow of a cross-PLMN congestion control back-off timer in a scenario 1 provided in an embodiment of the present application.

The embodiments of the present application will be described clearly and completely in conjunction with the accompanying drawings in the embodiments of the present application. The described embodiments are only some embodiments instead of all embodiments of the present application.

NAS congestion control in a 5G network is a situation that a corresponding congestion control back-off timer is transmitted after an access and mobility management function (AMF) or a session management function (SMF) receives a NAS message for session management (SM) when a DNN, S-NSSAI or a [DNN, S-NSSAI] combination in a network is overloaded. In a running process of the congestion control back-off timer, the UE does not allow a SM message, corresponding to the DNN, the S-NSSAI or the [DNN, S-NSSAI] combination, of the congestion control back-off timer to be transmitted. When the UE moves from a first PLMN to a second PLMN, whether a congestion control back-off timer of an access point name (APN) of a 4G network is still suitable for the second PLMN is not clearly described in a 4G network standard protocol. It is indicated in the 5G network that a congestion control back-off timer of the DNN, the S-NSSAI or the [DNN, S-NSSAI] combination received by the UE and transmitted to the UE by the SMF in the second PLMN is not required to be taken into consideration when the SMF is changed and the UE establishes a PDU session. However, it is possible to bring unnecessary signaling overhead. For example, when a congestion control back-off timer of a DNN is received in a HPLMN and when the UE moves to a visiting PLMN (VPLMN), a PDU SESSION ESTABLISHMENT REQUEST message of the DNN is transmitted and the congestion control back-off timer of the DNN received in the HPLMN is still running at present, it is possible to establish a home-routed PDU session, and the PDU SESSION ESTABLISHMENT REQUEST message may be still refused due to the congestion of the current DNN.

Therefore, with regard to the problem whether a running congestion control back-off timer received in a previous PLMN is required to be taken into consideration by the UE when the UE receives a congestion control back-off timer and the UE moves from the current PLMN to another PLMN while the congestion control back-off timer is running, embodiments of the present application proposes the problem whether the congestion control back-off timer is required to be taken into consideration in the new PLMN if the congestion control back-off timer assigned in the old PLMN is running when it is determined, according to indication information provided by a network side, that the PLMN of the UE is changed.

Embodiments of the present application provide a method and apparatus for transmitting a message, and a control method and apparatus therefor. The methods and the apparatuses are based on the same application concept. Since the problem solving principles of the methods and the apparatuses are similar, the implementations of the methods and the apparatuses may refer to each other, the repeated descriptions thereof are omitted herein.

The embodiments of the present application are suitable for various systems and are particularly suitable for a 5G system. For example, the applicable systems may be a global system of mobile communication (GSM) system, a code division multiple access (CDMA) system, a wideband code division multiple access (WCDMA) general packet radio service (GPRS) system, a long term evolution (LTE) system, a LTE frequency division duplex (FDD) system, a LTE time division duplex (TDD) system, a universal mobile telecommunication system (UMTS), a worldwide interoperability for microwave access (WiMAX) system, a 5G system, a 5G NR system and the like. Each of the various systems includes terminal equipment and network equipment.

The terminal equipment related to the embodiments of the present application may refer to equipment providing voice and/or data connectivity for a user, handheld equipment with a wireless connection function or other processing equipment connected to a wireless modem. It is possible that the terminal equipment has different names in the different systems, for example, the terminal equipment may be referred to as user equipment in the 5G system. Wireless terminal equipment may be in communication with one or more core networks by a radio access network (RAN) and may be mobile terminal equipment such as a mobile phone (or referred to as a "cellular" phone) and a computer with the mobile terminal equipment, for example, the wireless terminal equipment may be a portable mobile device, a pocket-size mobile device, a handheld mobile device, a computer built-in mobile device or a vehicle-mounted mobile device, and they exchanges languages and/or data with a radio access network. For example, the wireless terminal equipment may be a personal communication service (PCS) telephone, a cordless telephone, a session initiated protocol (SIP) phone, a wireless local loop (WLL) station, a personal digital assistant (PDA) and the like. The wireless terminal equipment may be also referred to as a system, a subscriber unit, a subscriber station, a mobile station, a mobile, a remote station, an access point, a remote terminal, an access terminal, a user terminal, a user agent and a user device and is not limited in the embodiments of the present application.

The network equipment related to the embodiments of the present application may refer to a base station, and the base station may include a plurality of cells. According to different specific application occasions, the base station may also be referred to as an access point, or refer to equipment in communication with the wireless terminal equipment through one or more sectors on an air interface in an access network or named in other ways. The network equipment may be used for mutually converting a received air frame and internet protocol (IP) by packeting to be used as a router between the wireless terminal equipment and the rest part of the access network, and the rest part of the access network may include an internet protocol (IP) communication network. The network equipment is also and coordinating the attribute management on the air interface. For example, the network equipment related to the embodiments of the present application may be network equipment BTS (base transceiver station) in GSM or CDMA, or network equipment NodeB in WCDMA, or evolutional network equipment eNB or e-NodeB (evolutional node B) in a LTE system, a 5G base station in a 5G network architecture (next generation system), or a home evolved base station HeNB (home evolved node B), a relay node, a home base station (femto), a pico base station (pico) and the like, and is not limited in the embodiments of the present application.

All the embodiments of the present application will be described in detail below in conjunction with the accompanying drawings of the description. It should be noted that the showing order of the embodiments of the present application only represents the order of the embodiments.

When the UE receives a congestion control back-off timer (that is a timer, and the UE may not transmit a SM message corresponding to the timer with the type before the timer expires) and the UE moves from the current PLMN (a first PLMN) to another PLMN (a second PLMN) while the congestion control back-off timer is running, should the UE consider a running congestion control back-off timer received in a previous PLMN? The focus of the problem is that a DNN, S-NSSAI or a [DNN, S-NSSAI] combination corresponding to the congestion control back-off timer assigned in the network in the old PLMN (the first PLMN) is in which PLMN. If a PDU session established in the new PLMN (the second PLMN) by the UE is not involved to the DNN, the S-NSSAI or the [DNN, S-NSSAI] combination corresponding to the congestion control back-off timer in the old PLMN, the running congestion control back-off timer specified in the old PLMN is not required to be taken into consideration by the UE. Conversely, the UE needs to transmit a PDU session message of the DNN, the S-NSSAI or the [DNN, S-NSSAI] combination after the congestion control back-off timer of the corresponding DNN, S-NSSAI or [DNN, S-NSSAI] combination expires.

Therefore, when the UE needs to establish a PDU session in a new PLMN, if the DNN, the S-NSSAI or the [DNN, S-NSSAI] combination corresponding to the PDU session has a timer received in a corresponding old PLMN, the UE decides whether to transmit a SM message after the congestion control back-off timer of the corresponding DNN, S-NSSAI or [DNN, S-NSSAI] combination expires according to indication information, for the DNN, the S-NSSAI or the [DNN, S-NSSAI] combination, received in a network.

The network indicates to the UE that an anchor point of the corresponding DNN of the UE in a VPLMN is in a HPLMN or the VPLMN. It is possible that an AMF indicates the information to the UE in a DL NAS TRANSPORT message due to network congestion; or a SMF specifies the information to the UE in a PDU session determination process; or the SMF specifies the information to the UE when the SMF assigns a congestion control back-off timer to the UE. In one embodiment, the network is and indicating, in a URSP, whether the anchor point of the DNN of the UE in the VPLMN should be in the HPLMN or the VPLMN.

The network indicates, to the UE, whether S-NSSAI corresponding to the congestion control back-off timer is a S-NSSAI slice of the current PLMN or a S-NSSAI slice of the HPLMN. It is possible that the AMF indicates the information to the UE in the DL NAS TRANSPORT message due to network congestion; or the SMF specifies the information to the UE when the SMF assigns the congestion control back-off timer to the UE.

Specific judging criteria include, for example, the following.

Firstly, for a congestion control back-off timer of a DNN:
when a received DNN indicates a DNN of which an anchor point is in the HPLMN, a congestion control back-off timer corresponding to the DNN is required to be taken into consideration when the UE transmits a SM message for a PDU session corresponding to the DNN after the PLMN is changed, and the UE is allowed to transmit the SM message for the PDU session corresponding to the DNN until the congestion control back-off timer expires;
when the received DNN indicates a DNN of which an anchor point is in the VPLMN, the congestion control back-off timer corresponding to the DNN is not required to be taken into consideration when the SM message for the PDU session corresponding to the DNN is transmitted after the PLMN is changed; or
when the received DNN of the congestion control back-off timer of the DNN is empty, the congestion control back-off timer corresponding to the DNN is not required to be taken into consideration after the PLMN is changed.

It should be noted that the congestion control back-off timer required to be taken into consideration in the embodiments of the present application, that is, the congestion control back-off timer, is still valid, and if the congestion control back-off timer is not required to be taken into consideration, it is proven that the congestion control back-off timer is invalid.

Secondly, for a congestion control back-off timer of S-NSSAI:
when a received NAS message of the congestion control back-off timer of the S-NSSAI indicates a S-NSSAI slice of a HPLMN:
if a network indicates that the DNN is a DNN required to be anchored to the HPLMN, the congestion control back-off timer corresponding to the S-NSSAI is required to be taken into consideration when the UE transmits a SM message for a PDU session corresponding to the S-NSSAI and the DNN after the PLMN is changed; or
if the network indicates that the DNN is a DNN of which an anchor point is in the VPLMN, the congestion control back-off timer corresponding to the S-NSSAI is not required to be taken into consideration when the UE transmits the SM message for the PDU session corresponding to the S-NSSAI and the DNN after the PLMN is changed.

When the received NAS message of the congestion control back-off timer of the S-NSSAI indicates a S-NSSAI slice of a VPLMN, the congestion control back-off timer corresponding to the S-NSSAI is not required to be taken into consideration when the UE transmits a SM message for a PDU session corresponding to the S-NSSAI after the PLMN is changed; or
when the received S-NSSAI of the congestion control back-off timer of the S-NSSAI is empty, the congestion control back-off timer of the S-NSSAI is not required to be taken into consideration after the PLMN is changed.

Thirdly, for a congestion control back-off timer of a [S-NSSAI, DNN] combination:
when a network indicates that the received DNN of the congestion control back-off timer corresponding to the [S-NSSAI, DNN] combination is a DNN of which an anchor point is in the HPLMN, the S-NSSAI slice in the [S-NSSAI, DNN] combination should be also the S-NSSAI slice of the HPLMN; and the congestion control back-off timer corresponding to the [S-NSSAI, DNN] combination is required to be taken into consideration when the UE transmits a SM message corresponding to the [S-NSSAI, DNN] combination after the PLMN is changed;
when the network indicates that the received DNN of the congestion control back-off timer corresponding to the [S-NSSAI, DNN] combination is a DNN of which an anchor point is in the VPLMN, the S-NSSAI slice in the [S-NSSAI, DNN] combination should be also the S-NSSAI slice of the VPLMN; and the congestion control back-off timer corresponding to the [S-NSSAI, DNN] combination is not required to be taken into consideration when the UE transmits the SM message corresponding to the [S-NSSAI, DNN] combination after the PLMN is changed; or when at least one of the received DNN and S-NSSAI corresponding to the congestion control back-off timer of the [S-NSSAI, DNN] combination is empty, the congestion control back-off timer corresponding to the [S-NSSAI, DNN] combination is not required to be taken into consideration after the PLMN is changed.

Several specific embodiments will be provided as follows.

Embodiment 1

Referring to FIG. 1, in the current embodiment, it is assumed that UE receives a congestion control back-off timer of a DNN in a HPLMN, and a network indicates, according to a URSP, that the current DNN is required to be anchored to a HPLMN. When the UE moves to a VPLMN and the current congestion control back-off timer is still running, if the UE needs to establish a PDU session of the DNN in the VPLMN, a SM message is not required to be transmitted until the congestion control back-off timer expires.

Embodiment 2

Figure 2:
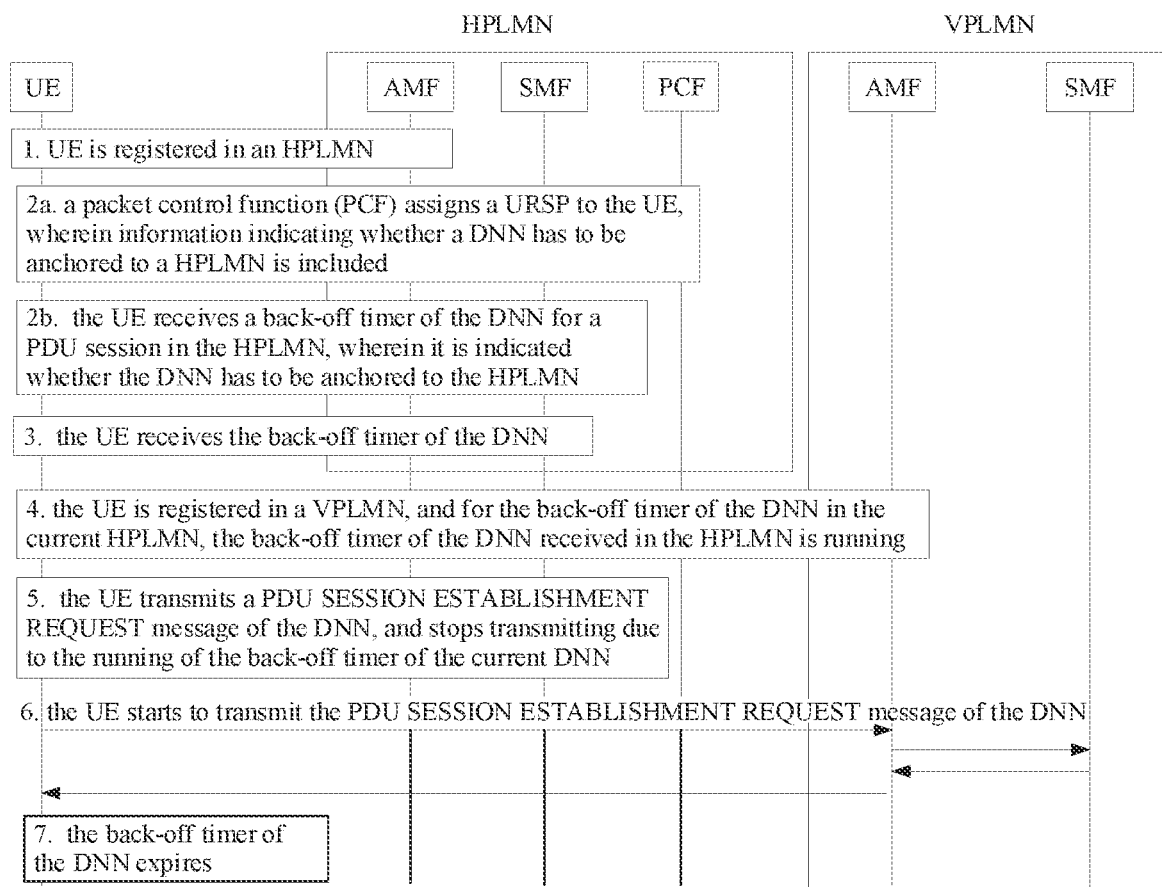
FIG. 2 is a schematic diagram showing a processing flow of a cross-PLMN congestion control back-off timer in a scenario 2 provided in an embodiment of the present application.

Referring to FIG. 2, in the current embodiment, it is assumed that UE receives a congestion control back-off timer of a DNN in a HPLMN, and a network indicates, according to a URSP, that the current DNN is not anchored to a HPLMN. When the UE moves to a VPLMN and the congestion control back-off timer of the current DNN is still running, if the UE needs to establish a PDU session of the DNN in the VPLMN, a SM message is transmitted without waiting for the congestion control back-off timer to expire.

Embodiment 3

Figure 3:
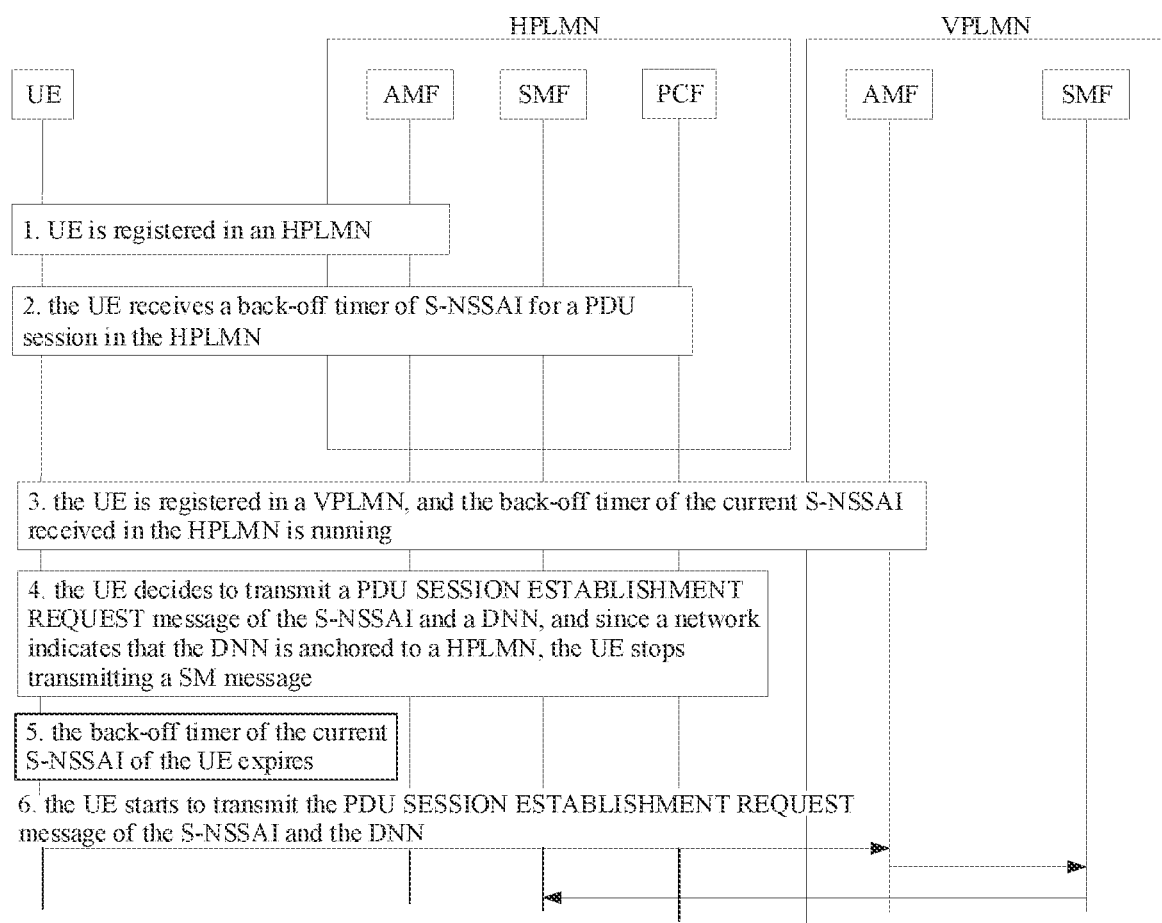
FIG. 3 is a schematic diagram showing a processing flow of a cross-PLMN congestion control back-off timer in a scenario 3 provided in an embodiment of the present application.

Referring to FIG. 3, in the current embodiment, it is assumed that UE receives a congestion control back-off timer of a piece of S-NSSAI in a HPLMN. When the UE moves to a VPLMN and the congestion control back-off timer of the current S-NSSAI is still running, if the UE needs to establish a PDU session of the S-NSSAI in the VPLMN and a network indicates that a DNN of a PDU session associated with the S-NSSAI is required to be anchored to a HPLMN, when transmitting a SM message, the UE does need to transmit the SM message until the congestion control back-off timer expires.

Embodiment 4

Figure 4:
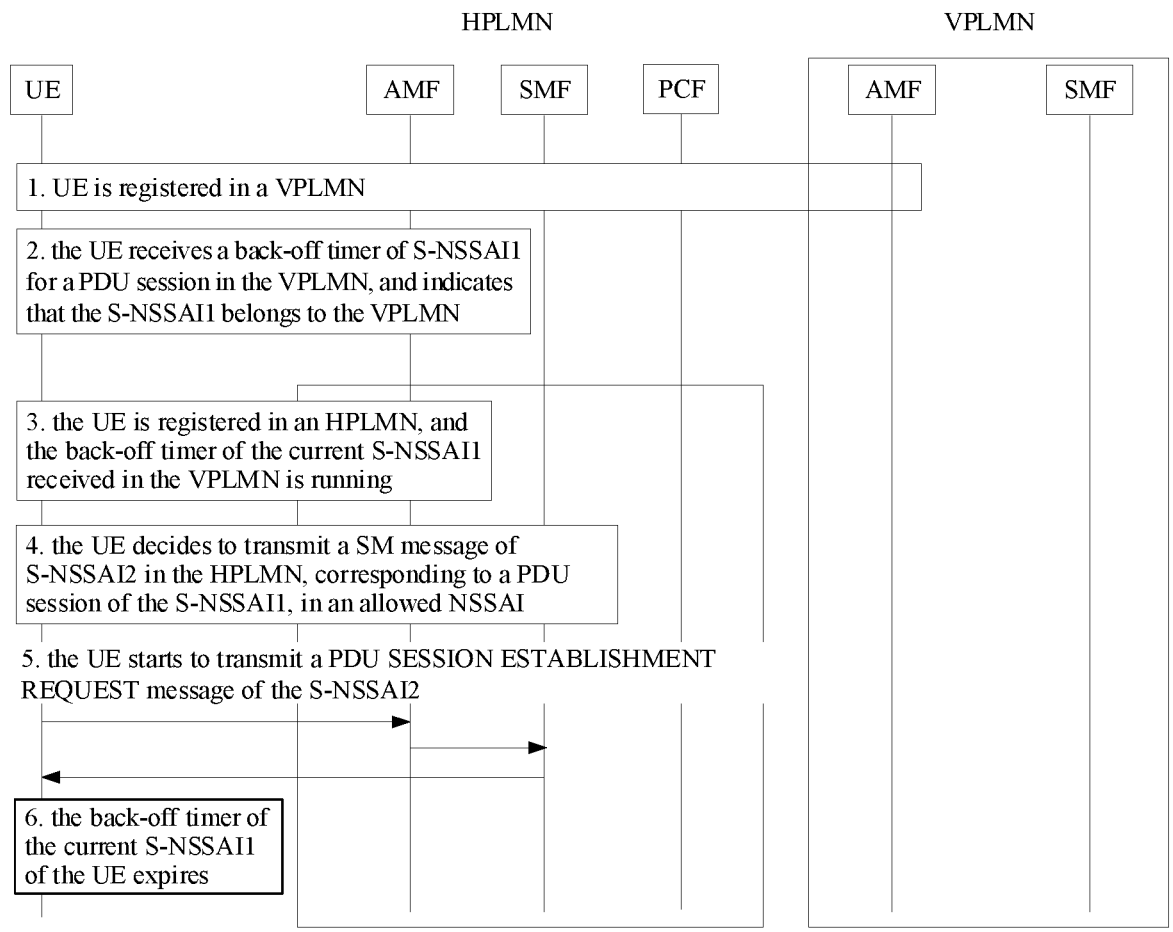
FIG. 4 is a schematic diagram showing a processing flow of a cross-PLMN congestion control back-off timer in a scenario 4 provided in an embodiment of the present application.

Referring to FIG. 4, in the current embodiment, it is assumed that UE receives a congestion control back-off timer of a piece of S-NSSAI1 in a VPLMN, and a network indicates, according to a DL NAS TRANSPORT message, that the S-NSSAI1 is a slice of the VPLMN, and a slice of a HPLMN in an allowed NSSAI corresponding to the S-NSSAI1 is S-NSSAI2. When the UE moves to the HPLMN, if the UE needs to establish a PDU session of the S-NSSAI2 in the HPLMN, a SM message is transmitted without waiting for the congestion control back-off timer of the S-NSSAI1 to expire.

Embodiment 5

Figure 5:
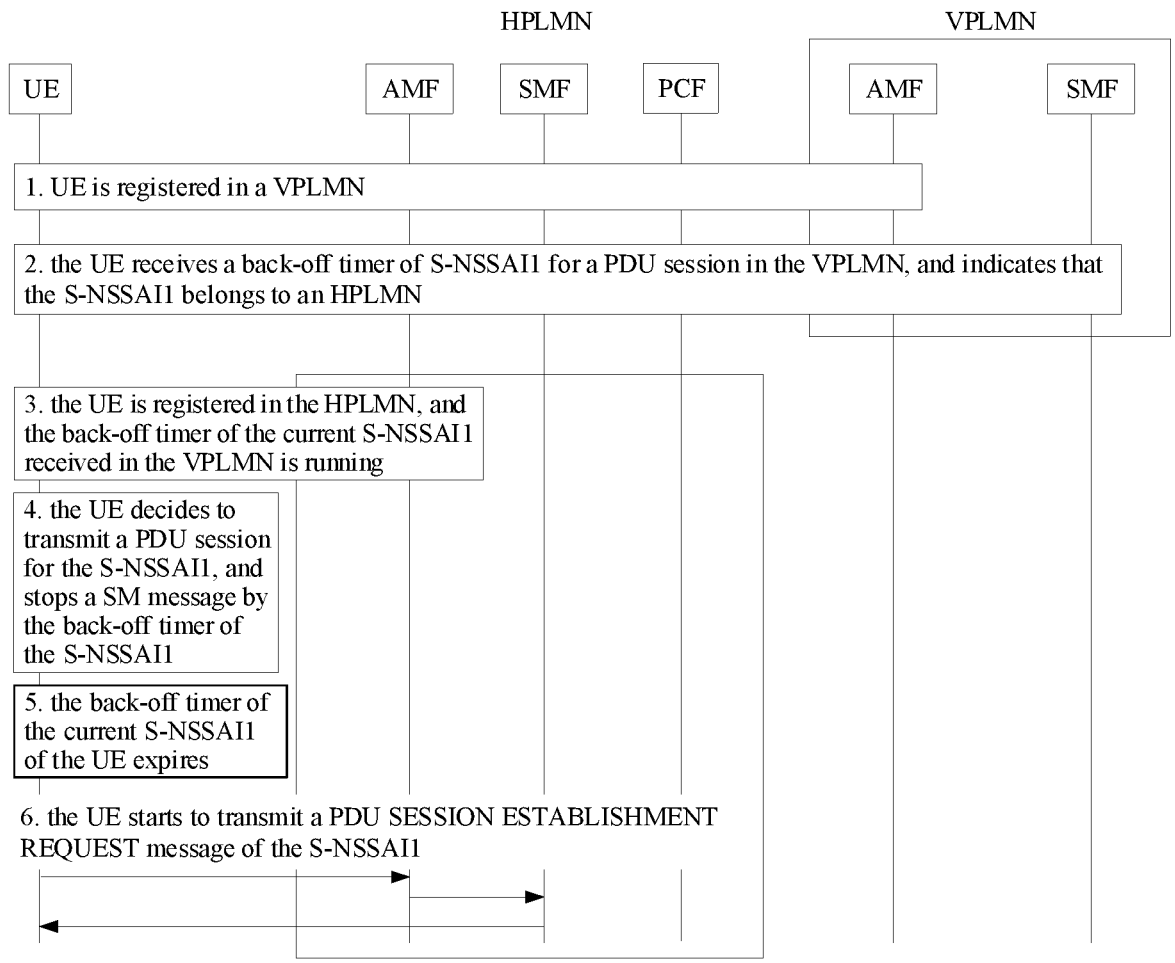
FIG. 5 is a schematic diagram showing a processing flow of a cross-PLMN congestion control back-off timer in a scenario 5 provided in an embodiment of the present application.

Referring to FIG. 5, in the current embodiment, it is assumed that UE receives a congestion control back-off timer of a piece of S-NSSAI1 in a VPLMN, and a network indicates, according to a SM message corresponding to the S-NSSAI1, that the S-NSSAI1 is a slice of a HPLMN. When the UE moves to the HPLMN, if the UE needs to establish a PDU session of the S-NSSAI1 in the HPLMN, the SM message is not required to be transmitted until the congestion control back-off timer of the S-NSSAI1 expires.

Embodiment 6

Figure 6:
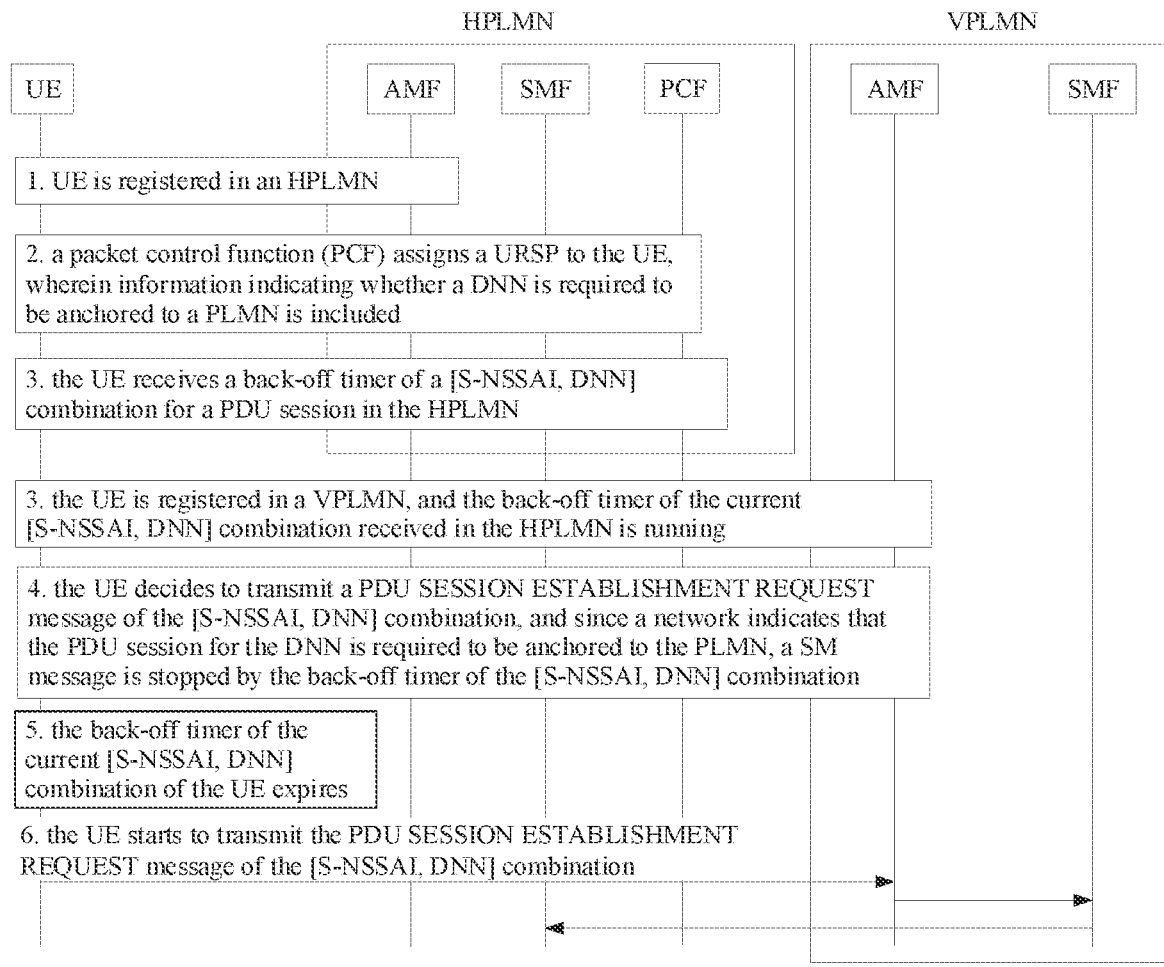
FIG. 6 is a schematic diagram showing a processing flow of a cross-PLMN congestion control back-off timer in a scenario 6 provided in an embodiment of the present application.

Referring to FIG. 6, in the current embodiment, it is assumed that UE receives a congestion control back-off timer of a [S-NSSAI, DNN] combination in a HPLMN, a network message indicates that the S-NSSAI is a slice of the HPLMN, and a network indicates, according to a URSP, that a DNN corresponding to the congestion control back-off timer is required to be anchored to the HPLMN. When the UE moves to a VPLMN, if the UE needs to establish a PDU session of the S-NSSAI and the DNN in the VPLMN, the SM message is not required to be transmitted until the congestion control back-off timer of the [S-NSSAI, DNN] combination expires. SM messages transmitted by other UE may be transmitted without taking the congestion control back-off timer into consideration.

Embodiment 7

Figure 7:
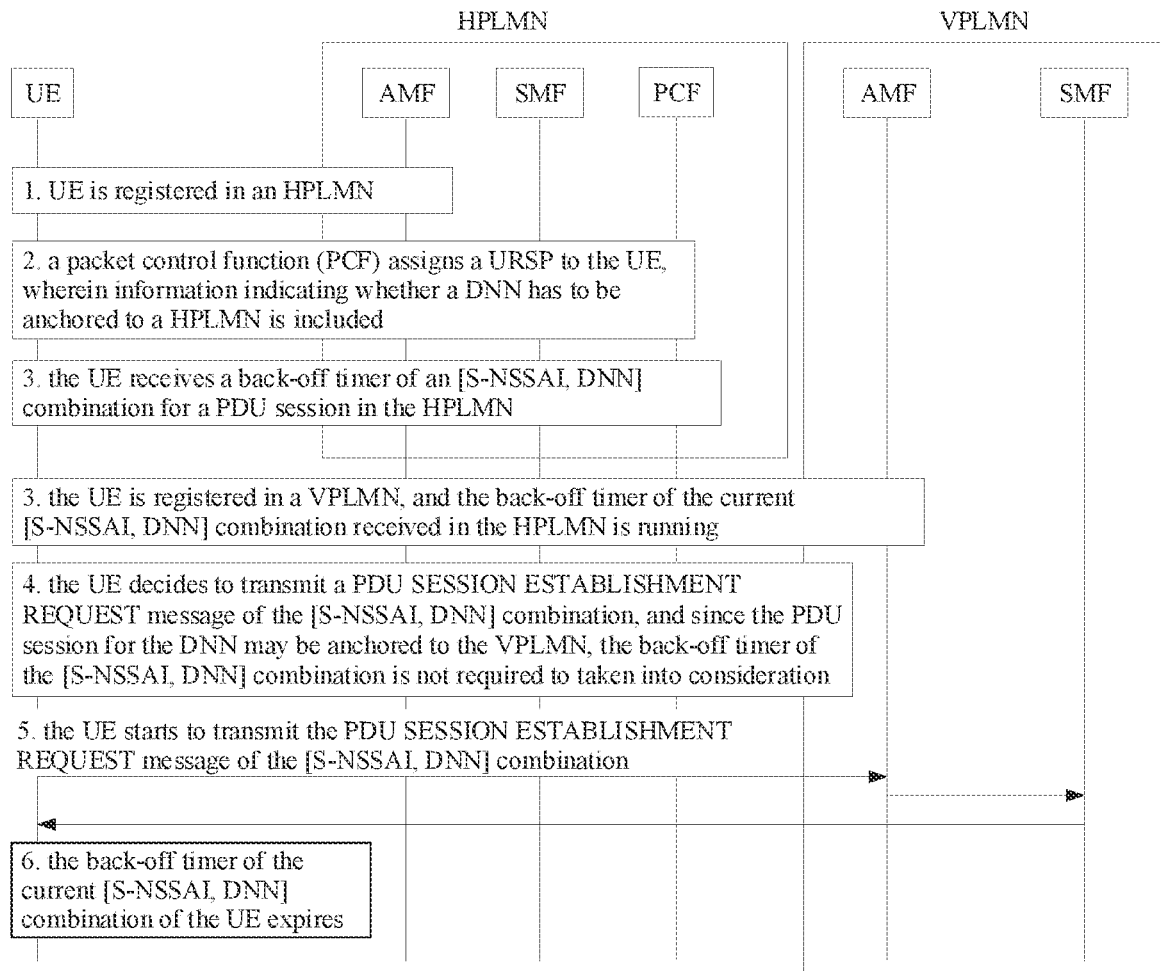
FIG. 7 is a schematic diagram showing a processing flow of a cross-PLMN congestion control back-off timer in a scenario 7 provided in an embodiment of the present application.

Referring to FIG. 7, in the current embodiment, it is assumed that UE receives a congestion control back-off timer of a [S-NSSAI, DNN] combination in a HPLMN, a network message indicates that the S-NSSAI is a slice of the HPLMN, and a network indicates, according to a URSP, that a DNN corresponding to the congestion control back-off timer is not required to be anchored to the HPLMN. When the UE moves to a VPLMN, if the UE needs to establish a PDU session of the S-NSSAI and the DNN in the VPLMN, the UE may directly transmit a SM message without taking the congestion control back-off timer into consideration.

Embodiment 8

Figure 8:
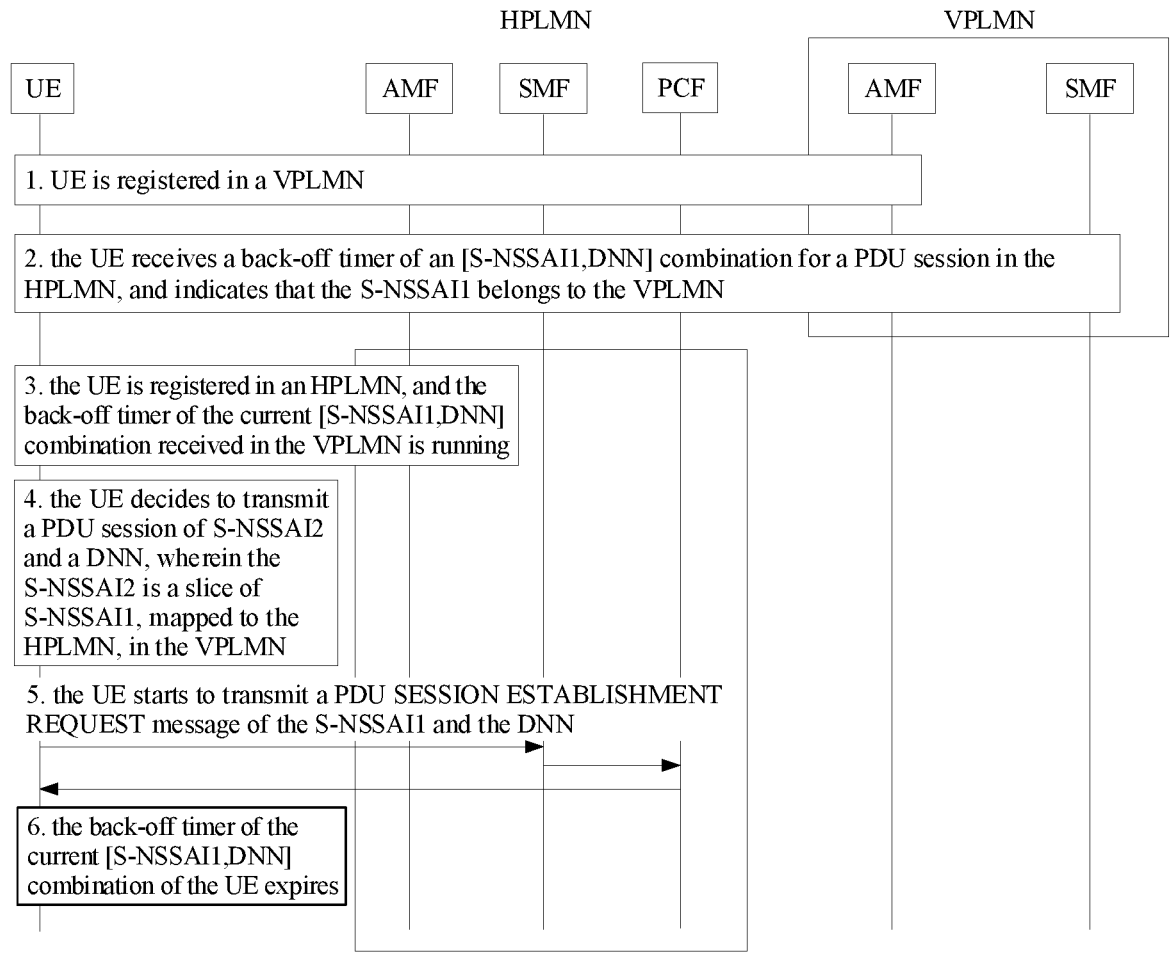
FIG. 8 is a schematic diagram showing a processing flow of a cross-PLMN congestion control back-off timer in a scenario 8 provided in an embodiment of the present application.

Referring to FIG. 8, in the current embodiment, it is assumed that UE receives a congestion control back-off timer of a [S-NSSAI1, DNN] combination in a VPLMN, a network message indicates that the S-NSSAI1 is a slice of the VPLMN, and a network also indicates that a corresponding DNN is allowed to be anchored to the VPLMN. When the UE moves to a HPLMN, if the UE needs to establish a SM message of S-NSSAI2 of the mapped HPLMN in allowed NSSAI corresponding to the S-NSSAI1 and the DNN in the HPLMN, the UE may directly transmit the SM message without taking the congestion control back-off timer into consideration.

Figure 9:
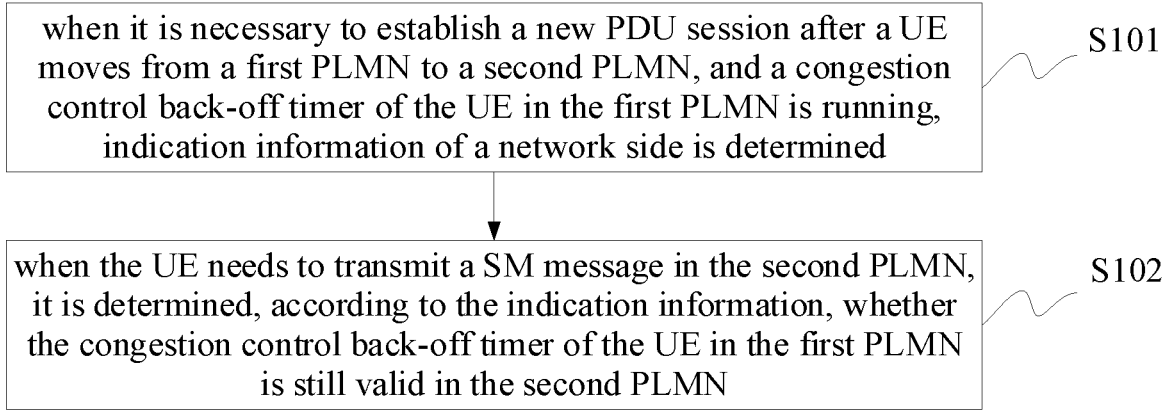
FIG. 9 is a schematic diagram showing a process of a method for transmitting a message provided in an embodiment of the present application.

Based on above, at a terminal side, referring to FIG. 9, an embodiment of the present application provides a method for transmitting a message, including the following.

S101, when determining to establish a new PDU session after a UE moves from a first PLMN to a second PLMN, indication information of a network side is determined.

S102, when the UE needs to transmit a SM message in the second PLMN, it is determined, according to the indication information, whether a congestion control back-off timer of the UE in the first PLMN is still valid in the second PLMN.

By using the method, when it is necessary to establish the new PDU session after the UE moves from the first PLMN to the second PLMN, the indication information of the network side is determined; and when the UE needs to transmit the SM message in the second PLMN, it is determined, according to the indication information, whether the congestion control back-off timer of the UE in the first PLMN is still valid in the second PLMN, to solve the problem of whether the congestion control back-off timer still running in the first PLMN is still valid in the second PLMN after the UE moves from the first PLMN to the second PLMN, and further avoiding the problem that the SM message transmitted by the UE is refused due to the congestion control back-off timer or the SM message may not be transmitted in time due to incorrect consideration on the congestion control back-off timer.

In one embodiment, the indication information is used for indicating:
whether a PDU session corresponding to a DNN is required to be anchored to a HPLMN; and/or,
whether S-NSSAI is S-NSSAI of a HPLMN or S-NSSAI of a VPLMN.

In one embodiment, the indication information indicating whether the PDU session corresponding to the DNN is required to be anchored to the HPLMN is determined in one of the following ways that:
the network side indicates, according to a URSP, whether the PDU session corresponding to the DNN is required to be anchored to the HPLMN;
or, indication information of the DNN corresponding to the PDU session is specified when the network side transmits a NAS message to the UE.

In one embodiment, when the NAS message carries a congestion control back-off timer associated with the DNN, the indication information of the DNN is specified by an AMF for transmitting a DL NAS TRANSPORT message.

In one embodiment, the indication information of the DNN corresponding to the current PDU session is specified in a PDU session determination process by a SMF, or, the indication information of the DNN is specified when the congestion control back-off timer associated with the DNN is carried.

In one embodiment, the congestion control back-off timer associated with the DNN is: a congestion control back-off timer of the DNN, the S-NSSAI or a [S-NSSAI, DNN] combination for the PDU session corresponding to the current DNN.

In one embodiment, when the network side specifies a congestion control back-off timer associated with the current S-NSSAI to the UE, it is indicated whether the current S-NSSAI is the S-NSSAI of the HPLMN or the S-NSSAI of the VPLMN accessed at present.

In one embodiment, when the NAS message includes the congestion control back-off timer associated with the S-NSSAI, relevant information of the S-NSSAI is indicated by the AMF for transmitting the DL NAS TRANSPORT message or the SMF for transmitting a SM message.

In one embodiment, the congestion control back-off timer associated with the S-NSSAI is a congestion control back-off timer of the S-NSSAI or a [S-NSSAI, DNN] combination for a PDU session corresponding to the S-NSSAI.

In one embodiment, when a congestion control back-off timer of a DNN of the UE in the first PLMN is running while the UE needs to transmit a SM message of the DNN in the second PLMN:
when the received information indicates that the PDU session corresponding to the DNN is required to be anchored to a HPLMN, the congestion control back-off timer of the DNN is determined to be still valid when the UE transmits a SM message for the PDU session corresponding to the DNN after the PLMN is changed, and the UE is allowed to transmit the SM message for the PDU session corresponding to the DNN until the congestion control back-off timer expires;
when the received information indicates that an anchor point of the DNN is allowed to be in a VPLMN, the congestion control back-off timer of the DNN is determined to be invalid when the SM message for the PDU session corresponding to the DNN is transmitted after the PLMN is changed; or
when the received DNN, corresponding to the congestion control back-off timer of the DNN, in a PDU SESSION ESTABLISHMENT message transmitted by the UE, is an empty PDU session, the congestion control back-off timer of the DNN is determined to be invalid in a new PLMN after the PLMN is changed.

In one embodiment, when the UE moves from the first PLMN to the second PLMN, the congestion control back-off timer of the S-NSSAI of the UE in the first PLMN is running, and the UE needs to transmit a SM message of the S-NSSAI in the second PLMN:
when the received NAS message of the congestion control back-off timer of the S-NSSAI indicates that the S-NSSAI is a S-NSSAI slice of the HPLMN, if a network indicates that a DNN is required to be anchored to the HPLMN, the congestion control back-off timer of the S-NSSAI is required to be taken into consideration when the UE transmits a SM message for a PDU session corresponding to the S-NSSAI and the DNN after the PLMN is changed; and if the network indicates that the DNN is a DNN of which an anchor point is in a VPLMN, the congestion control back-off timer of the S-NSSAI is not required to be taken into consideration when the UE transmits the SM message for the PDU session corresponding to the S-NSSAI and the DNN after the PLMN is changed;
when the received NAS message of the congestion control back-off timer of the S-NSSAI indicates that the S-NSSAI is a S-NSSAI slice of the current VPLMN, the congestion control back-off timer of the S-NSSAI is not required to be taken into consideration when the UE transmits the SM message for the PDU session after the PLMN is changed; or
when the received S-NSSAI, corresponding to the congestion control back-off timer of the S-NSSAI, in a PDU SESSION ESTABLISHMENT message transmitted by the UE, is an empty PDU session, the congestion control back-off timer of the S-NSSAI is not required to be taken into consideration after the PLMN is changed.

In one embodiment, when the UE moves from the first PLMN to the second PLMN, a congestion control back-off timer of a [S-NSSAI, DNN] combination of the UE in the first PLMN is running, and the UE needs to transmit a SM message of the S-NSSAI and the DNN in the second PLMN:
when a network indicates that the received DNN of the congestion control back-off timer of the [S-NSSAI, DNN] combination is a DNN required to be anchored to the HPLMN, the S-NSSAI in the [S-NSSAI, DNN] combination is also the S-NSSAI slice of the HPLMN, and the congestion control back-off timer of the [S-NSSAI, DNN] combination is required to be taken into consideration when the UE transmits a SM message corresponding to the [S-NSSAI, DNN] combination after the PLMN is changed;

when the network indicates that the received DNN of the congestion control back-off timer of the [S-NSSAI, DNN] combination is a DNN of which an anchor point is allowed to be in a VPLMN, the S-NSSAI in the [S-NSSAI, DNN] combination is also the S-NSSAI slice of the VPLMN, and the congestion control back-off timer of the [S-NSSAI, DNN] combination is not required to be taken into consideration when the UE transmits a SM message corresponding to the [S-NSSAI, DNN] combination after the PLMN is changed; or when at least one of the received DNN and S-NSSAI, corresponding to the congestion control back-off timer of the [S-NSSAI, DNN] combination, in a PDU SESSION ESTABLISHMENT message transmitted by the UE, is an empty PDU session, the congestion control back-off timer of the [S-NSSAI, DNN] combination is not required to be taken into consideration after the PLMN is changed.

Figure 10:
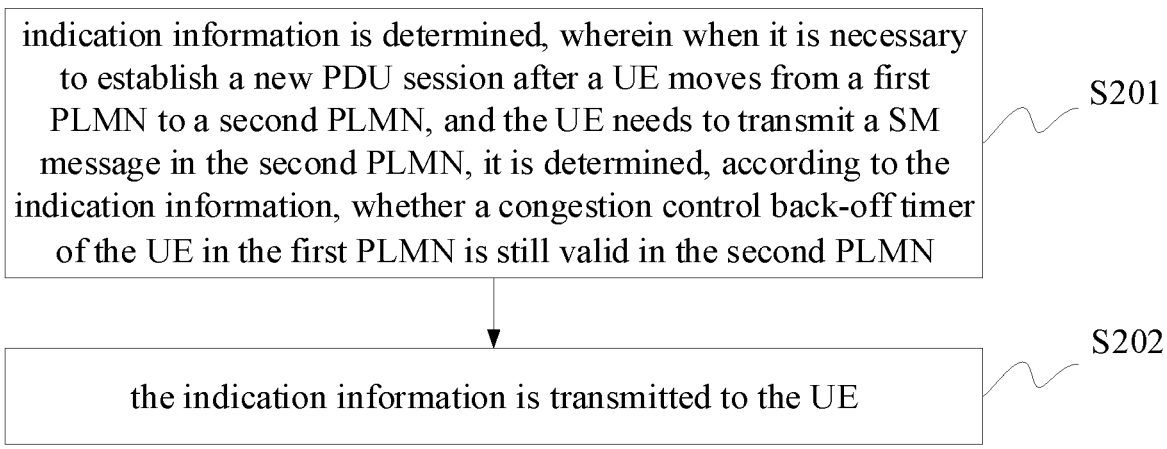
FIG. 10 is a schematic diagram showing a process of a control method for transmitting a message provided in an embodiment of the present application.

Accordingly, at a network side, referring to FIG. 10, an embodiment of the present application provides a control method for transmitting a message, including the following.

S201, indication information is determined, and when determining to establish a new PDU session after a UE moves from a first PLMN to a second PLMN, and the UE needs to transmit a SM message in the second PLMN, it is determined, according to the indication information, whether a congestion control back-off timer of the UE in the first PLMN is still valid in the second PLMN.

S202, the indication information is transmitted to the UE.

In one embodiment, the indication information is used for indicating:
whether a PDU session corresponding to a DNN is required to be anchored to a HPLMN; and/or,
whether S-NSSAI is S-NSSAI of a HPLMN or S-NSSAI of a VPLMN.

In one embodiment, the indication information indicating whether the PDU session corresponding to the DNN is required to be anchored to the HPLMN is transmitted in one of the following ways that:
the network side indicates, according to a URSP, whether the PDU session corresponding to the DNN is required to be anchored to the HPLMN;
or, indication information of the DNN corresponding to the PDU session is specified when the network side transmits a NAS message to the UE.

In one embodiment, when the NAS message carries a congestion control back-off timer associated with the DNN, the indication information of the DNN is specified by an AMF for transmitting a DL NAS TRANSPORT message.

In one embodiment, the indication information of the DNN corresponding to the current PDU session is specified in a PDU session determination process by a SMF, or, the indication information of the DNN is specified when the congestion control back-off timer associated with the DNN is carried.

In one embodiment, the congestion control back-off timer associated with the DNN is: a congestion control back-off timer of the DNN, the S-NSSAI or a [S-NSSAI, DNN] combination for the PDU session corresponding to the current DNN.

In one embodiment, when the network side specifies a congestion control back-off timer associated with the current S-NSSAI to the UE, it is indicated whether the current S-NSSAI is the S-NSSAI of the HPLMN or the S-NSSAI of the VPLMN accessed at present.

In one embodiment, when the NAS message includes the congestion control back-off timer associated with the S-NSSAI, relevant information of the S-NSSAI is indicated by the AMF for transmitting the DL NAS TRANSPORT message or the SMF for transmitting a SM message.

In one embodiment, the congestion control back-off timer associated with the S-NSSAI is a congestion control back-off timer of the S-NSSAI or a [S-NSSAI, DNN] combination for a PDU session corresponding to the S-NSSAI.

Figure 11:
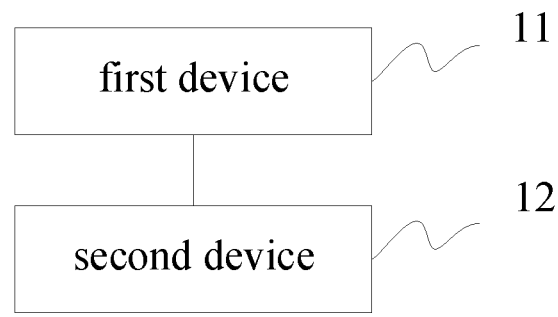
FIG. 11 is a schematic diagram showing a structure of an apparatus for transmitting a message provided in an embodiment of the present application.

At a terminal side, referring to FIG. 11, an embodiment of the present application provides another apparatus for transmitting a message, including:
a first device 11, configured to, when determining to establish a new PDU session after a UE moves from a first PLMN to a second PLMN, determine indication information of a network side; and
a second device 12, configured to, when the UE needs to transmit a SM message in the second PLMN, determine, according to the indication information, whether a congestion control back-off timer of the UE in the first PLMN is still valid in the second PLMN.

In one embodiment, the indication information is used for indicating:
whether a PDU session corresponding to a DNN is required to be anchored to a HPLMN; and/or,
whether S-NSSAI is S-NSSAI of a HPLMN or S-NSSAI of a VPLMN.

In one embodiment, the first device 11 determines the indication information indicating whether the PDU session corresponding to the DNN is required to be anchored to the HPLMN in one of the following ways that:
the network side indicates, according to a URSP, whether the PDU session corresponding to the DNN is required to be anchored to the HPLMN;
or, indication information of the DNN corresponding to the PDU session is specified when the network side transmits a NAS message to the UE.

In one embodiment, when the NAS message carries a congestion control back-off timer associated with the DNN, the indication information of the DNN is specified by an AMF for transmitting a DL NAS TRANSPORT message.

In one embodiment, the indication information of the DNN corresponding to the current PDU session is specified in a PDU session determination process by a SMF, or, the indication information of the DNN is specified when the congestion control back-off timer associated with the DNN is carried.

In one embodiment, the congestion control back-off timer associated with the DNN is: a congestion control back-off timer of the DNN, the S-NSSAI or a [S-NSSAI, DNN] combination for the PDU session corresponding to the current DNN.

In one embodiment, when the network side specifies a congestion control back-off timer associated with the current S-NSSAI to the UE, it is indicated whether the current S-NSSAI is the S-NSSAI of the HPLMN or the S-NSSAI of the VPLMN accessed at present.

In one embodiment, when the NAS message includes the congestion control back-off timer associated with the S-NSSAI, relevant information of the S-NSSAI is indicated by the AMF for transmitting the DL NAS TRANSPORT message or the SMF for transmitting a SM message.

In one embodiment, the congestion control back-off timer associated with the S-NSSAI is a congestion control back-off timer of the S-NSSAI or a [S-NSSAI, DNN] combination for a PDU session corresponding to the S-NSSAI.

In one embodiment, when a congestion control back-off timer of a DNN of the UE in the first PLMN is running while the UE needs to transmit a SM message of the DNN in the second PLMN, the second device 12 is specifically configured to:
- when the received information indicates that the PDU session corresponding to the DNN is required to be anchored to the HPLMN, determine the congestion control back-off timer of the DNN to be still valid when the UE transmits a SM message for the PDU session corresponding to the DNN after the PLMN is changed, and allowing the UE to transmit the SM message for the PDU session corresponding to the DNN until the congestion control back-off timer expires;
- when the received information indicates that an anchor point of the DNN is allowed to be in the VPLMN, determine the congestion control back-off timer of the DNN to be invalid when the SM message for the PDU session corresponding to the DNN is transmitted after the PLMN is changed; or
- when the received DNN, corresponding to the congestion control back-off timer of the DNN, in the PDU SESSION ESTABLISHMENT message transmitted by the UE, is an empty PDU session, determine the congestion control back-off timer of the DNN to be invalid in a new PLMN after the PLMN is changed.

In one embodiment, when the UE moves from the first PLMN to the second PLMN, the congestion control back-off timer of the S-NSSAI of the UE in the first PLMN is running, and the UE needs to transmit a SM message of the S-NSSAI in the second PLMN, the second device 12 is specifically configured to:
- when the received NAS message of the congestion control back-off timer of the S-NSSAI indicates that the S-NSSAI is a S-NSSAI slice of the HPLMN, if a network indicates that the DNN is a DNN required to be anchored to the HPLMN, require to take the congestion control back-off timer of the S-NSSAI into consideration when the UE transmits a SM message for a PDU session corresponding to the S-NSSAI and the DNN after the PLMN is changed; and if the network indicates that the DNN is a DNN of which an anchor point is in a VPLMN, not require to take the congestion control back-off timer of the S-NSSAI into consideration when the UE transmits the SM message for the PDU session corresponding to the S-NSSAI and the DNN after the PLMN is changed;
- when the received NAS message of the congestion control back-off timer of the S-NSSAI indicates that the S-NSSAI is a S-NSSAI slice of the current VPLMN, not require to take the congestion control back-off timer of the S-NSSAI into consideration when the UE transmits the SM message for the PDU session after the PLMN is changed; or
- when the received S-NSSAI, corresponding to the congestion control back-off timer of the S-NSSAI, in the PDU SESSION ESTABLISHMENT message transmitted by the UE, is an empty PDU session, not require to take the congestion control back-off timer of the S-NSSAI into consideration after the PLMN is changed.

In one embodiment, when the UE moves from the first PLMN to the second PLMN, a congestion control back-off timer of a [S-NSSAI, DNN] combination of the UE in the first PLMN is running, and the UE needs to transmit a SM message of the S-NSSAI and the DNN in the second PLMN, the second device 12 is specifically configured to:
- when a network indicates that the received DNN of the congestion control back-off timer of the [S-NSSAI, DNN] combination is a DNN required to be anchored to the HPLMN, determine the S-NSSAI in the [S-NSSAI, DNN] combination to be the S-NSSAI slice of the HPLMN, and require to take the congestion control back-off timer of the [S-NSSAI, DNN] combination into consideration when the UE transmits a SM message corresponding to the [S-NSSAI, DNN] combination after the PLMN is changed;
- when the network indicates that the received DNN of the congestion control back-off timer of the [S-NSSAI, DNN] combination is a DNN of which an anchor point is allowed to be in the VPLMN, determine the S-NSSAI in the [S-NSSAI, DNN] combination to be also the S-NSSAI slice of the VPLMN, and not require to take the congestion control back-off timer of the [S-NSSAI, DNN] combination into consideration when the UE transmits the SM message corresponding to the [S-NSSAI, DNN] combination after the PLMN is changed; or
- when at least one of the received DNN and S-NSSAI, corresponding to the congestion control back-off timer of the [S-NSSAI, DNN] combination, in the PDU SESSION ESTABLISHMENT message transmitted by the UE, is an empty PDU session, not require to take the congestion control back-off timer of the [S-NSSAI, DNN] combination into consideration after the PLMN is changed.

Figure 12:
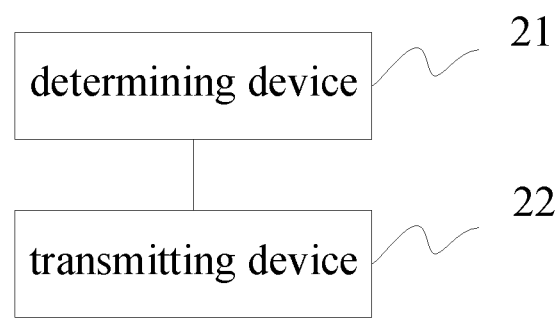
FIG. 12 is a schematic diagram showing a structure of a control apparatus for transmitting a message provided in an embodiment of the present application.

At a network side, referring to FIG. 12, an embodiment of the present application provides another control apparatus for transmitting a message, including:
- a determining device 21, configured to determine indication information, and when determining to establish a new PDU session after a UE moves from a first PLMN to a second PLMN, and the UE needs to transmit a SM message in the second PLMN, it is determined, according to the indication information, whether a congestion control back-off timer of the UE in the first PLMN is still valid in the second PLMN; and
- a transmitting device 22, configured to transmit the indication information to the UE.

In one embodiment, the indication information is used for indicating:
- whether a PDU session corresponding to a DNN is required to be anchored to a HPLMN; and/or,
- whether S-NSSAI is S-NSSAI of a HPLMN or S-NSSAI of a VPLMN.

In one embodiment, the transmitting device 22 transmits the indication information indicating whether the PDU session corresponding to the DNN is required to be anchored to the HPLMN in one of the following ways that:
- it is indicated, according to a URSP, whether the PDU session corresponding to the DNN is required to be anchored to the HPLMN;
- or, indication information of the DNN corresponding to the PDU session is specified when a NAS message is transmitted to the UE.

In one embodiment, when the NAS message carries a congestion control back-off timer associated with the DNN, the indication information of the DNN is specified by an AMF for transmitting a DL NAS TRANSPORT message.

In one embodiment, the indication information of the DNN corresponding to the current PDU session is specified in a PDU session determination process by a SMF, or, the indication information of the DNN is specified when the congestion control back-off timer associated with the DNN is carried.

In one embodiment, the congestion control back-off timer associated with the DNN is: a congestion control back-off timer of the DNN, the S-NSSAI or a [S-NSSAI, DNN] combination for the PDU session corresponding to the current DNN.

In one embodiment, when the network side specifies a congestion control back-off timer associated with the current S-NSSAI to the UE, it is indicated whether the current S-NSSAI is the S-NSSAI of the HPLMN or the S-NSSAI of the VPLMN accessed at present.

In one embodiment, when the NAS message includes the congestion control back-off timer associated with the S-NSSAI, relevant information of the S-NSSAI is indicated by the AMF for transmitting the DL NAS TRANSPORT message or the SMF for transmitting a SM message.

In one embodiment, the congestion control back-off timer associated with the S-NSSAI is a congestion control back-off timer of the S-NSSAI or a [S-NSSAI, DNN] combination for a PDU session corresponding to the S-NSSAI.

It should be noted that the division of the devices in the embodiment of the present application is schematic, is only logic functional division, and there may be other division ways during actual implementation. In addition, all the functional devices in each embodiment of the present application may be integrated in a processing unit, or each unit physically exists alone, or two or more units are integrated in one unit. The above-mentioned integrated units may be implemented in a form of hardware or a form of a software functional unit.

When being implemented in the form of the software functional unit and sold or used as an independent product, the integrated units may be stored in a computer readable storage medium. Based on such understanding, the substances of the embodiments of the present application, or a part thereof making a contribution to the prior art, or all or parts of the embodiments in a form of a software product, and the computer software product is stored in a storage medium and includes a plurality of instructions for indicating computer equipment (which may be a personnel computer, a server or network equipment and the like) or a processor to execute all or parts of steps of the method in each embodiment of the present application. The aforementioned storage medium includes various media, such as a U disk, a mobile hard disk, an read-only memory (ROM), an random access memory (RAM), a diskette or an optical disk, and storing program codes.

Figure 13:
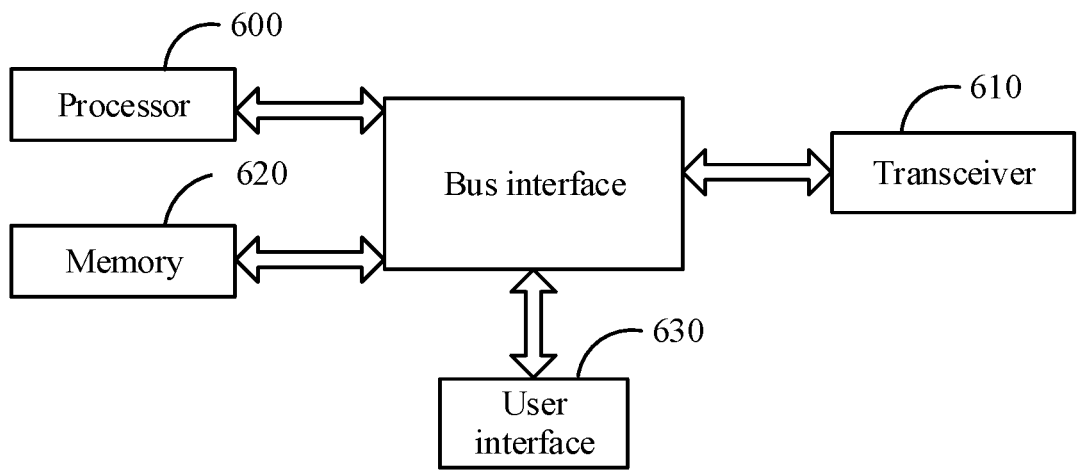
FIG. 13 is a schematic diagram showing a structure of another apparatus for transmitting a message provided in an embodiment of the present application.

Referring to FIG. 13, at a terminal side, an embodiment of the present application provides another apparatus for transmitting a message, including:

a processor 600, configured to read a program in a memory 620 and execute the following processes that:

when determining to establish a new PDU session after a UE moves from a first PLMN to a second PLMN, indication information of a network side is determined; and when the UE needs to transmit a SM message in the second PLMN, it is determined, according to the indication information, whether a congestion control back-off timer of the UE in the first PLMN is still valid in the second PLMN.

In one embodiment, the indication information is used for indicating:

whether a PDU session corresponding to a DNN is required to be anchored to a HPLMN; and/or, whether S-NSSAI is S-NSSAI of a HPLMN or S-NSSAI of a VPLMN.

In one embodiment, the processor 600 determines the indication information indicating whether the PDU session corresponding to the DNN is required to be anchored to the HPLMN in one of the following ways that:

the network side indicates, according to a URSP, whether the PDU session corresponding to the DNN is required to be anchored to the HPLMN;

or, indication information of the DNN corresponding to the PDU session is specified when the network side transmits a NAS message to the UE.

In one embodiment, when the NAS message carries a congestion control back-off timer associated with the DNN, the indication information of the DNN is specified by an AMF for transmitting a DL NAS TRANSPORT message.

In one embodiment, the indication information of the DNN corresponding to the current PDU session is specified in a PDU session determination process by a SMF, or, the indication information of the DNN is specified when the congestion control back-off timer associated with the DNN is carried.

In one embodiment, the congestion control back-off timer associated with the DNN is: a congestion control back-off timer of the DNN, the S-NSSAI or a [S-NSSAI, DNN] combination for the PDU session corresponding to the current DNN.

In one embodiment, when the network side specifies a congestion control back-off timer associated with the current S-NSSAI to the UE, it is indicated whether the current S-NSSAI is the S-NSSAI of the HPLMN or the S-NSSAI of the VPLMN accessed at present.

In one embodiment, when the NAS message includes the congestion control back-off timer associated with the S-NSSAI, relevant information of the S-NSSAI is indicated by the AMF for transmitting the DL NAS TRANSPORT message or the SMF for transmitting a SM message.

In one embodiment, the congestion control back-off timer associated with the S-NSSAI is a congestion control back-off timer of the S-NSSAI or a [S-NSSAI, DNN] combination for a PDU session corresponding to the S-NSSAI.

In one embodiment, when a congestion control back-off timer of a DNN of the UE in the first PLMN is running while the UE needs to transmit a SM message of the DNN in the second PLMN, the processor 600 is specifically configured to:

when the information received by the transceiver 610 indicates that the PDU session corresponding to the DNN is required to be anchored to the HPLMN, determine the congestion control back-off timer of the DNN to be still valid when a SM message for the PDU session corresponding to the DNN is transmitted after the PLMN is changed, and allow to transmit the SM message for the PDU session corresponding to the DNN until the congestion control back-off timer expires;

when the information received by the transceiver 610 indicates that an anchor point of the DNN is allowed to be in the VPLMN, determine the congestion control back-off timer of the DNN to be invalid when the SM message for the PDU session corresponding to the DNN is transmitted after the PLMN is changed; or when the DNN, corresponding to the congestion control back-off timer of the DNN, in the PDU SESSION ESTABLISHMENT message received by the transceiver 610 and transmitted by the UE, is an empty PDU session, determine the congestion control back-off timer of the DNN to be invalid in a new PLMN after the PLMN is changed.

In one embodiment, when the UE moves from the first PLMN to the second PLMN, the congestion control back-off timer of the S-NSSAI of the UE in the first PLMN is running, and the UE needs to transmit a SM message of the S-NSSAI in the second PLMN, the processor 600 is specifically configured to:

when the NAS message, received by the transceiver 610, of the congestion control back-off timer of the S-NSSAI indicates that the S-NSSAI is a S-NSSAI slice of the HPLMN, if a network indicates that a DNN is required to be anchored to the HPLMN, require to take the congestion control back-off timer of the S-NSSAI into consideration when a SM message for a PDU session corresponding to the S-NSSAI and the DNN is transmitted after the PLMN is changed; and if the network indicates that a DNN is a DNN of which an anchor point is allowed to be in the VPLMN, not require to take the congestion control back-off timer of the S-NSSAI into consideration when the UE transmits the SM message for the PDU session corresponding to the S-NSSAI and the DNN after the PLMN is changed;

when the NAS message, received by the transceiver 610, of the congestion control back-off timer of the S-NSSAI indicates that the S-NSSAI is a S-NSSAI slice of the current VPLMN, not require to take the congestion control back-off timer of the S-NSSAI into consideration when the SM message for the PDU session is transmitted after the PLMN is changed; or when the S-NSSAI, corresponding to the congestion control back-off timer of the S-NSSAI, in the PDU SESSION ESTABLISHMENT message received by the transceiver 610 and transmitted by the UE, is an empty PDU session, not require to take the congestion control back-off timer of the S-NSSAI into consideration after the PLMN is changed.

In one embodiment, when the UE moves from the first PLMN to the second PLMN, a congestion control back-off timer of a [S-NSSAI, DNN] combination of the UE in the first PLMN is running, and the UE needs to transmit a SM message of the S-NSSAI and the DNN in the second PLMN, the processor 600 is specifically configured to:

when a network indicates that the received DNN of the congestion control back-off timer of the [S-NSSAI, DNN] combination is a DNN required to be anchored to the HPLMN, determine the S-NSSAI in the [S-NSSAI, DNN] combination to be also the S-NSSAI slice of the HPLMN, and require to take the congestion control back-off timer of the [S-NSSAI, DNN] combination into consideration when a SM message corresponding to the [S-NSSAI, DNN] combination is transmitted after the PLMN is changed;

when the network indicates that the received DNN of the congestion control back-off timer of the [S-NSSAI, DNN] combination is a DNN of which an anchor point is allowed to be in the VPLMN, determine the S-NSSAI in the [S-NSSAI, DNN] combination to be also the S-NSSAI slice of the VPLMN, and not require to take the congestion control back-off timer of the [S-NSSAI, DNN] combination into consideration when the SM message corresponding to the [S-NSSAI, DNN] combination is transmitted after the PLMN is changed; or when at least one of the DNN and S-NSSAI, corresponding to the congestion control back-off timer of the [S-NSSAI, DNN] combination, in the PDU SESSION ESTABLISHMENT message received by the transceiver 610 and transmitted by the UE, is an empty PDU session, not require to take the congestion control back-off timer of the [S-NSSAI, DNN] combination into consideration after the PLMN is changed.

The transceiver 610 is configured to receive and transmit data under the control of the processor 600.

In FIG. 13, a bus architecture may include any number of buses and bridges interconnected with each other and is specifically used for linking various circuits of one or more processors represented by the processor 600 and a memory represented by the memory 620 together. The bus architecture is also and linking various other circuits such as peripheral equipment, a voltage stabilizer and a power management circuit together, and therefore, the further description of the bus architecture is omitted herein. A bus interface is provided with an interface. The transceiver 610 may be a plurality of elements including a transmitter and a receiver and provides units used for communicating with various other devices on a transmission medium. For different UEs, the user interface 630 may also be an interface which may be externally or internally connected with required equipment, and the connected equipment includes, but is not limited to a keypad, a display, a loudspeaker, a microphone, an operating lever and the like.

The processor 600 takes charge of managing the bus architecture and general processing, and the memory 620 is and storing data used when the processor 600 executes an operation.

In one embodiment, the processor 600 may be a central processing unit (CPU), an application specific integrated circuit (ASIC), a field-programmable gate array (FPGA) or a complex programmable logic device (CPLD).

Figure 14:
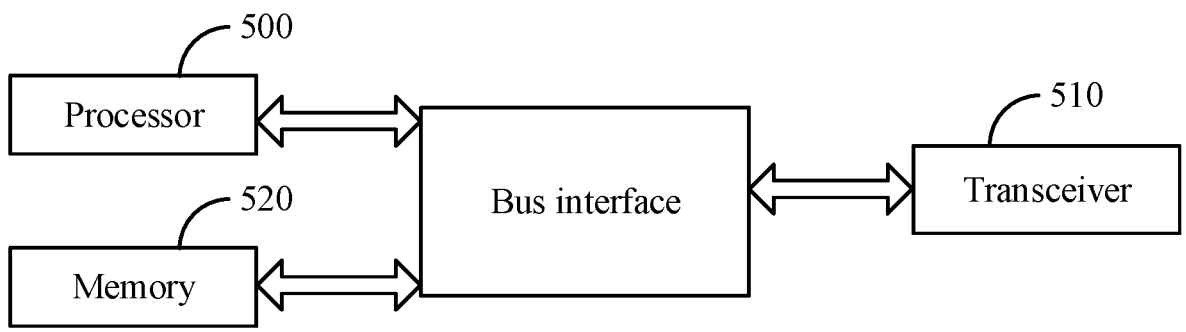
FIG. 14 is a schematic diagram showing a structure of another control apparatus for transmitting a message provided in an embodiment of the present application.

Referring to FIG. 14, at a network side, an embodiment of the present application provides another control apparatus for transmitting a message, including:
 a processor 500, configured to read a program in a memory 520 and execute the following processes that:
 indication information is determined, and when determining to establish a new PDU session after a UE moves from a first PLMN to a second PLMN, and the UE needs to transmit a SM message in the second PLMN, it is determined, according to the indication information, whether a congestion control back-off timer of the UE in the first PLMN is still valid in the second PLMN; and
 the indication information is transmitted to the UE by a transceiver 510.

In one embodiment, the indication information is used for indicating:
 whether a PDU session corresponding to a DNN is required to be anchored to a HPLMN; and/or,
 whether S-NSSAI is S-NSSAI of a HPLMN or S-NSSAI of a VPLMN.

In one embodiment, the transceiver 510 transmits the indication information indicating whether the PDU session corresponding to the DNN is required to be anchored to the HPLMN in one of the following ways that:
 it is indicated, according to a URSP, whether the PDU session corresponding to the DNN is required to be anchored to the HPLMN;
 or, indication information of the DNN corresponding to the PDU session is specified when the transceiver 510 transmits a NAS message to the UE.

In one embodiment, when the NAS message carries a congestion control back-off timer associated with the DNN, the indication information of the DNN is specified by an AMF for transmitting a DL NAS TRANSPORT message.

In one embodiment, the indication information of the DNN corresponding to the current PDU session is specified in a PDU session determination process by a SMF, or, the indication information of the DNN is specified when the congestion control back-off timer associated with the DNN is carried.

In one embodiment, the congestion control back-off timer associated with the DNN is: a congestion control back-off timer of the DNN, the S-NSSAI or a [S-NSSAI, DNN] combination for the PDU session corresponding to the current DNN.

In one embodiment, when the processor 500 specifies a congestion control back-off timer associated with the current S-NSSAI to the UE, it is indicated whether the current S-NSSAI is the S-NSSAI of the HPLMN or the S-NSSAI of the VPLMN accessed at present.

In one embodiment, when the NAS message includes the congestion control back-off timer associated with the S-NSSAI, relevant information of the S-NSSAI is indicated by the AMF for transmitting the DL NAS TRANSPORT message or the SMF for transmitting a SM message.

In one embodiment, the congestion control back-off timer associated with the S-NSSAI is: a congestion control back-off timer of the S-NSSAI or a [S-NSSAI, DNN] combination for a PDU session corresponding to the S-NSSAI.

In one embodiment, when a congestion control back-off timer of a DNN of the UE in the first PLMN is running while the UE needs to transmit a SM message of the DNN in the second PLMN:
  when the received information indicates that the PDU session corresponding to the DNN is required to be anchored to the HPLMN, the congestion control back-off timer of the DNN is determined to be still valid when the UE transmits a SM message for the PDU session corresponding to the DNN after the PLMN is changed, and the UE is allowed to transmit the SM message for the PDU session corresponding to the DNN until the congestion control back-off timer expires;
  when the received information indicates that an anchor point of the DNN is allowed to be in the VPLMN, the congestion control back-off timer of the DNN is determined to be invalid when the SM message for the PDU session corresponding to the DNN is transmitted after the PLMN is changed; or
  when the received DNN, corresponding to the congestion control back-off timer of the DNN, in the PDU SESSION ESTABLISHMENT message transmitted by the UE, is an empty PDU session, the congestion control back-off timer of the DNN is determined to be invalid in a new PLMN after the PLMN is changed.

In one embodiment, when the UE moves from the first PLMN to the second PLMN, the congestion control back-off timer of the S-NSSAI of the UE in the first PLMN is running, and the UE needs to transmit a SM message of the S-NSSAI in the second PLMN:
  when the NAS message, received by the UE, of the congestion control back-off timer of the S-NSSAI indicates that the S-NSSAI is a S-NSSAI slice of the HPLMN, if a network indicates that a DNN is required to be anchored to the HPLMN, the congestion control back-off timer of the S-NSSAI is required to be taken into consideration when the UE transmits a SM message for a PDU session corresponding to the S-NSSAI and the DNN after the PLMN is changed; and if the network indicates that a DNN is a DNN of which an anchor point is allowed to be in the VPLMN, the congestion control back-off timer of the S-NSSAI is not required to be taken into consideration when the UE transmits the SM message for the PDU session corresponding to the S-NSSAI and the DNN after the PLMN is changed;
  when the NAS message, received by the UE, of the congestion control back-off timer of the S-NSSAI indicates that the S-NSSAI is a S-NSSAI slice of the current VPLMN, the congestion control back-off timer of the S-NSSAI is not required to be taken into consideration when the UE transmits the SM message for the PDU session after the PLMN is changed; or
  when the S-NSSAI, corresponding to the congestion control back-off timer of the S-NSSAI received by the UE, in the PDU SESSION ESTABLISHMENT message transmitted by the UE, is an empty PDU session, the congestion control back-off timer of the S-NSSAI is not required to be taken into consideration after the PLMN is changed.

In one embodiment, when the UE moves from the first PLMN to the second PLMN, a congestion control back-off timer of a [S-NSSAI, DNN] combination of the UE in the first PLMN is running, and the UE needs to transmit a SM message of the S-NSSAI and the DNN in the second PLMN:
  when a network indicates that the received DNN of the congestion control back-off timer of the [S-NSSAI, DNN] combination is a DNN required to be anchored to the HPLMN, the S-NSSAI in the [S-NSSAI, DNN] combination is also the S-NSSAI slice of the HPLMN, and the congestion control back-off timer of the [S-NSSAI, DNN] combination is required to be taken into consideration when the UE transmits a SM message corresponding to the [S-NSSAI, DNN] combination after the PLMN is changed;
  when the network indicates that the received DNN of the congestion control back-off timer of the [S-NSSAI, DNN] combination is a DNN of which an anchor point is allowed to be in the VPLMN, the S-NSSAI in the [S-NSSAI, DNN] combination is also the S-NSSAI slice of the VPLMN, and the congestion control back-off timer of the [S-NSSAI, DNN] combination is not required to be taken into consideration when the UE transmits the SM message corresponding to the [S-NSSAI, DNN] combination after the PLMN is changed; or
  when at least one of the received DNN and S-NSSAI, corresponding to the congestion control back-off timer of the [S-NSSAI, DNN] combination, in the PDU SESSION ESTABLISHMENT message transmitted by the UE, is an empty PDU session, the congestion control back-off timer of the [S-NSSAI, DNN] combination is not required to be taken into consideration after the PLMN is changed.

The transceiver 510 is configured to receive and transmit data under the control of the processor 500.

In FIG. 14, a bus architecture may include any number of buses and bridges interconnected with each other and is specifically used for linking various circuits of one or more processors represented by the processor 500 and a memory represented by the memory 520 together. The bus architecture is also and linking various other circuits such as peripheral equipment, a voltage stabilizer and a power management circuit together, and therefore, the further description of the bus architecture is omitted herein. A bus interface is provided with an interface. The transceiver 510 may be a plurality of elements including a transmitter and a receiver, and provides units used for communicating with various other devices on a transmission medium. The processor 500 takes charge of managing the bus architecture and general processing, and the memory 520 is and storing data used when the processor 500 executes an operation.

The processor 500 may be a CPU, an ASIC, a FPGA or a CPLD.

Embodiments of the present application provide computing equipment which may be specifically a desktop computer, a portable computer, a smart phone, a tablet computer, a PDA, and the like. The computing equipment may include a CPU, a memory, input/output equipment and the like, the input equipment may include a keyboard, a mouse, a touch screen and the like, and the output equipment may include display equipment such as a liquid crystal display (LCD), a cathode ray tube (CRT) and the like.

The memory may include a ROM and a RAM and provide a program instruction and data stored in the memory for a processor. In the embodiments of the present application, the memory may be used for storing a program for any one of the methods provided by the embodiments of the present application.

By calling the program instruction stored in the memory, the processor is used for executing any one of the methods provided by the embodiments of the present application according to the obtained program.

An embodiment of the present application provides a computer storage medium for storing a computer program instruction used by the above-mentioned apparatuses provided by the embodiments of the present application, and the computer program instruction includes the program for executing any one of the methods provided by the embodiments of the present application.

The computer storage medium may be any one available medium or data storage equipment which may be accessed by a computer, including, but not limited to a memory (such as a flexible disk, a hard disk, a magnetic tape and a magneto-optic disk (MO)), an optical memory (such as a CD, a DVD, a BD and an HVD) and a semiconductor memory (such as a ROM, an EPROM, an EEPROM, a NAND FLASH, a SSD and the like.

The method for transmitting the message provided by the embodiments of the present application may be applied to terminal equipment, and the control method for transmitting the message may be applied to network equipment.

The terminal equipment may be referred to as UE, an Mobile Station (MS), a mobile terminal and the like. In one embodiment, the terminal is and realizing communication with one or more core networks through a RAN. For example, the terminal may be a mobile phone (or referred to as "cellular" phone) or a computer with mobility. For example, the terminal may also be a portable mobile device, a pocket-size mobile device, a handheld mobile device, a computer built-in mobile device or a vehicle-mounted mobile device.

The network equipment may be a base station (such as an access point) referring to equipment in communication with a wireless terminal through one or more sectors on an air interface in an access network. The base station may be used for mutually converting a received air frame and IP by packeting to be used as a router between the wireless terminal and the rest part of the access network, and the rest part of the access network may include an IP communication network. The base station is also and coordinating the attribute management on the air interface. For example, the base station may be a base station BTS in GSM or CDMA, or a base station NodeB in WCDMA, or evolutional base station eNB or e-NodeB (evolutional Node B) in LTE, or a gNB in a 5G system and the like, and is not limited in the embodiment of the present application.

The processing flow of the above-mentioned method may be implemented by using a software program, the software program may be stored in a storage medium, and the steps of the above-mentioned method is executed when the stored software program is called.

Based on above, in the embodiments of the present application, when the PLMN is changed, the UE decides, according to the information indicated by the network, whether the congestion control back-off timer assigned in the previous PLMN is required to be taken into consideration when the SM message is transmitted.

The network may indicate, according to the URSP, whether a PDU session of a DNN has to be anchored to the HPLMN. Or, it may be indicated, according to the NAS message transmitted to the UE by the network, whether the DNN corresponding to the current PDU session is required to be anchored to the HPLMN. When the NAS message includes the congestion control back-off timer associated with the DNN, indication may be performed by the AMF for transmitting the DL NAS TRANSPORT message or the SMF for transmitting the SM message. The SMF may indicate whether the DNN corresponding to the current PDU session is required to be anchored to the HPLMN in the PDU session determination process or when the congestion control back-off timer associated with the DNN is carried. The congestion control back-off timer associated with the DNN may be the congestion control back-off timer of the DNN or the congestion control back-off timer of the [S-NSSAI, DNN] combination.

The network may indicate, when the congestion control back-off timer associated with the current S-NSSAI is specified to the UE, whether the current S-NSSAI is the S-NSSAI of the HPLMN or the S-NSSAI of the VPLMN accessed at present. When the NAS message includes the congestion control back-off timer associated with the S-NSSAI, the indication may be performed by the AMF for transmitting the DL NAS TRANSPORT message or the SMF for transmitting the SM message. The congestion control back-off timer associated with the S-NSSAI may be the congestion control back-off timer of the S-NSSAI or the congestion control back-off timer of the [S-NSSAI, DNN] combination.

When the UE moves from the first PLMN to the second PLMN, a congestion control back-off timer of a DNN of the UE in the first PLMN is running, and the UE needs to transmit a SM message of the DNN in the second PLMN:

when the received DNN indicates a DNN of which an anchor point is in the HPLMN, the UE requires to take a congestion control back-off timer corresponding to the DNN into consideration when the UE transmits a SM message for a PDU session corresponding to the DNN after the PLMN is changed; and the UE is allowed to transmit the SM message for the PDU session corresponding to the DNN until the congestion control back-off timer expires;

when the received DNN indicates a DNN of which an anchor point is in the VPLMN, the UE does not require to take the congestion control back-off timer corresponding to the DNN into consideration when the SM message for the PDU session corresponding to the DNN is transmitted after the PLMN is changed; or when the received DNN of the congestion control back-off timer of the DNN is empty, the UE does not require to take the congestion control back-off timer corresponding to the DNN into consideration after the PLMN is changed.

When the UE moves from the first PLMN to the second PLMN, the congestion control back-off timer of a piece of S-NSSAI of the UE in the first PLMN is running, and the UE needs to transmit a SM message of the S-NSSAI in the second PLMN:

when the received NAS message of the congestion control back-off timer of the S-NSSAI indicates that the S-NSSAI is a S-NSSAI slice of the HPLMN;

if a network indicates that a DNN is a DNN of which an anchor point is in the HPLMN, the UE requires to take the congestion control back-off timer of the S-NSSAI into consideration when the UE transmits a SM message for a PDU session corresponding to the S-NSSAI and the DNN after the PLMN is changed; or if the network indicates that a DNN is a DNN of which an anchor point is in the VPLMN, the UE does not require to take the congestion control back-off timer of the S-NSSAI into consideration when the UE transmits the SM message for the PDU session corresponding to the S-NSSAI and the DNN after the PLMN is changed.

When the received NAS message of the congestion control back-off timer of the S-NSSAI indicates a S-NSSAI slice of a VPLMN, the congestion control back-off timer corresponding to the S-NSSAI is not required to be taken into consideration when the UE transmits a SM message for a PDU session corresponding to the S-NSSAI after the PLMN is changed; or when the received S-NSSAI of the congestion control back-off timer of the S-NSSAI is empty, the congestion control back-off timer of the S-NSSAI is not required to be taken into consideration after the PLMN is changed.

When the UE moves from the first PLMN to the second PLMN, a congestion control back-off timer of a [S-NSSAI, DNN] combination of the UE in the first PLMN is running, and the UE needs to transmit a SM message of the [S-NSSAI, DNN] combination in the second PLMN:

when a network indicates that the received DNN of the congestion control back-off timer of the [S-NSSAI, DNN] combination is a DNN of which an anchor point is in the HPLMN, the UE determines the S-NSSAI slice in the [S-NSSAI, DNN] combination to be also the S-NSSAI slice of the HPLMN, and requires to take the congestion control back-off timer of the [S-NSSAI, DNN] combination into consideration when the UE transmits a SM message corresponding to the [S-NSSAI, DNN] combination after the PLMN is changed;

when the network indicates that the received DNN of the congestion control back-off timer of the [S-NSSAI, DNN] combination is a DNN of which an anchor point is in the VPLMN, the UE determines the S-NSSAI slice in the [S-NSSAI, DNN] combination to be also the S-NSSAI slice of the VPLMN, and does not require to take the congestion control back-off timer corresponding to the [S-NSSAI, DNN] combination into consideration when the UE transmits the SM message corresponding to the [S-NSSAI, DNN] combination after the PLMN is changed; or when at least one of the received DNN and S-NSSAI of the congestion control back-off timer of the [S-NSSAI, DNN] combination is empty, the UE does not require to take the congestion control back-off timer of the [S-NSSAI, DNN] combination into consideration after the PLMN is changed.

According to the embodiments of the present application, the problem of whether a congestion control back-off timer still running in a first PLMN is still valid in a second PLMN after the PLMN of the UE is changed is solved. It is decided, according to relevant information of a DNN and/or S-NSSAI provided by a network, whether the congestion control back-off timer in the first PLMN is required to be taken into consideration in the second PLMN, to avoid the problem that a SM message transmitted by the UE is refused due to the congestion control back-off timer or the SM message may not be transmitted in time due to incorrect consideration on the congestion control back-off timer.

The embodiments of the present application may provide a method, a system or a computer program product. Therefore, a form of an embodiment in which hardware is completely adopted, an embodiment in which software is completely adopted or an embodiment in which software is combined with hardware may be adopted in the present application. Moreover, a computer program product form implemented on one or more readable storage mediums (which include, but are not limited to a magnetic disk memory, an optical memory and the like) including computer available program codes may be adopted in the present application.

The present application are described by referring to a flow diagram and/or a block diagram of the method, equipment (system) and the computer program product according to the embodiments of the present application. It should be understood that each flow and/or block in the flow diagram and/or the block diagram and a combination of flows and/or blocks in the flow diagram and/or the block diagram may be achieved by computer program instructions. These computer program instructions may be provided for a processor of a general-purpose computer, a special-purpose computer, an embedded processing machine or other programmable data processing equipment to generate a machine, and a device used for achieving a specified function in one or more flows in the flow diagram and/or one or more blocks in the block diagram is generated by an instruction executed by the processor of the computer or other programmable data processing equipment.

These computer program instructions may also be stored in a computer readable memory and guiding the computer or other programmable data processing equipment to work in a specific way, so that a manufactured product including an instruction device is generated by the instruction stored in the computer readable memory, and the instruction device achieves the specified function in one or more flows in the flow diagram and/or one or more blocks in the block diagram.

These computer program instructions may also be loaded on the computer or other programmable data processing equipment, and then, a series of operation steps are carried out on the computer or other programmable data processing equipment to generate processing realized by the computer, so that the instructions executed on the computer or other programmable data processing equipment provide the step of achieving the specified function in one or more flows in the flow diagram and/or one or more blocks in the block diagram.

What is claimed is:

1. A method for transmitting a message, comprising:
  when determining to establish a new packet data unit (PDU) session after a user equipment (UE) moves from a first public land mobile network (PLMN) to a second PLMN, determining indication information of a network side; and when the UE needs to transmit a session management (SM) message in the second PLMN, determining, according to the indication information, whether a congestion control back-off timer of the UE in the first PLMN is still valid in the second PLMN.

2. The method according to claim 1, wherein the indication information is used for indicating:
whether a PDU session corresponding to a data network name (DNN) is required to be anchored to a home PLMN (HPLMN); and/or,
whether single network slice selection assistance information (S-NSSAI) is S-NSSAI of a HPLMN or S-NSSAI of a visiting PLMN (VPLMN).

3. The method according to claim 2, wherein the indication information indicating whether the PDU session corresponding to the DNN is required to be anchored to the HPLMN is determined in one of following ways that:
the network side indicates, according to a UE route selection policy (URSP), whether the PDU session corresponding to the DNN is required to be anchored to the HPLMN;
or, indication information of the DNN corresponding to the PDU session is specified when the network side transmits a non-access-stratum (NAS) message to the UE.

4. The method according to claim 3, wherein when the NAS message carries a congestion control back-off timer associated with the DNN, the indication information of the DNN is specified by an access and mobility management function (AMF) for transmitting a downlink NAS TRANSPORT (DL NAS TRANSPORT) message.

5. The method according to claim 3, wherein the indication information of the DNN corresponding to a current PDU session is specified in a PDU session determination process by a session management function (SMF), or,
the indication information of the DNN is specified when the congestion control back-off timer associated with the DNN is carried.

6. The method according to claim 4, wherein the congestion control back-off timer associated with the DNN is:
a congestion control back-off timer of the DNN, the S-NSSAI or a [S-NSSAI, DNN] combination for the PDU session corresponding to a current DNN.

7. The method according to claim 5, wherein when the network side specifies a congestion control back-off timer associated with a current S-NSSAI to the UE, it is indicated whether the current S-NSSAI is the S-NSSAI of the HPLMN or the S-NSSAI of the VPLMN accessed at present.

8. The method according to claim 7, wherein when the NAS message comprises the congestion control back-off timer associated with the S-NSSAI, relevant information of the S-NSSAI is indicated by the AMF for transmitting the DL NAS TRANSPORT message or the SMF for transmitting a SM message.

9. The method according to claim 7, wherein the congestion control back-off timer associated with the S-NSSAI is a congestion control back-off timer of the S-NSSAI or a [S-NSSAI, DNN] combination for a PDU session corresponding to the S-NSSAI.

10. The method according to claim 1, wherein when a congestion control back-off timer of a DNN of the UE in the first PLMN is running while the UE needs to transmit a SM message of the DNN in the second PLMN:
when received information indicates that the PDU session corresponding to the DNN is required to be anchored to a HPLMN, the congestion control back-off timer of the DNN is determined to be still valid when the UE transmits a SM message for the PDU session corresponding to the DNN after the PLMN is changed, and the UE is allowed to transmit the SM message for the PDU session corresponding to the DNN until the congestion control back-off timer expires;
when a received information indicates that an anchor point of the DNN is allowed to be in a VPLMN, the congestion control back-off timer of the DNN is determined to be invalid when the SM message for the PDU session corresponding to the DNN is transmitted after the PLMN is changed; or
when a received DNN, corresponding to the congestion control back-off timer of the DNN, in a PDU SESSION ESTABLISHMENT message transmitted by the UE, is an empty PDU session, the congestion control back-off timer of the DNN is determined to be invalid in a new PLMN after the PLMN is changed.

11. The method according to claim 1, wherein when the UE moves from the first PLMN to the second PLMN, the congestion control back-off timer of the S-NSSAI of the UE in the first PLMN is running, and the UE needs to transmit a SM message of the S-NSSAI in the second PLMN:
when a received NAS message of the congestion control back-off timer of the S-NSSAI indicates that the S-NSSAI is a S-NSSAI slice of the HPLMN, if a network indicates that a DNN is required to be anchored to the HPLMN, the congestion control back-off timer of the S-NSSAI is required to be taken into consideration when the UE transmits a SM message for a PDU session corresponding to the S-NSSAI and the DNN after the PLMN is changed; and if the network indicates that a DNN is a DNN of which an anchor point is in a VPLMN, the congestion control back-off timer of the S-NSSAI is not required to be taken into consideration when the UE transmits the SM message for the PDU session corresponding to the S-NSSAI and the DNN after the PLMN is changed;
when a received NAS message of the congestion control back-off timer of the S-NSSAI indicates that the S-NSSAI is a S-NSSAI slice of a current VPLMN, the congestion control back-off timer of the S-NSSAI is not required to be taken into consideration when the UE transmits the SM message for the PDU session after the PLMN is changed; or
when a received S-NSSAI, corresponding to the congestion control back-off timer of the S-NSSAI, in a PDU SESSION ESTABLISHMENT message transmitted by the UE, is an empty PDU session, the congestion control back-off timer of the S-NSSAI is not required to be taken into consideration after the PLMN is changed.

12. The method according to claim 1, wherein when the UE moves from the first PLMN to the second PLMN, a congestion control back-off timer of a [S-NSSAI, DNN] combination of the UE in the first PLMN is running, and the UE needs to transmit a SM message of the S-NSSAI and the DNN in the second PLMN:
when a received DNN of the congestion control back-off timer of the [S-NSSAI, DNN] combination is a DNN required to be anchored to the HPLMN, indicated by a network, the S-NSSAI in the [S-NSSAI, DNN] combination is also a S-NSSAI slice of the HPLMN, and the congestion control back-off timer of the [S-NSSAI, DNN] combination is required to be taken into consideration when the UE transmits a SM message corresponding to the [S-NSSAI, DNN] combination after the PLMN is changed;

when a received DNN of the congestion control back-off timer of the [S-NSSAI, DNN] combination is a DNN of which an anchor point is allowed to be in a VPLMN, indicated by the network, the S-NSSAI in the [S-NSSAI, DNN] combination is also a S-NSSAI slice of the VPLMN, and the congestion control back-off timer of the [S-NSSAI, DNN] combination is not required to be taken into consideration when the UE transmits a SM message corresponding to the [S-NSSAI, DNN] combination after the PLMN is changed; or when a received DNN and/or S-NSSAI, corresponding to the congestion control back-off timer of the [S-NSSAI, DNN] combination, in a PDU SESSION ESTABLISHMENT message transmitted by the UE, is an empty PDU session, the congestion control back-off timer of the [S-NSSAI, DNN] combination is not required to be taken into consideration after the PLMN is changed.

13. A control method for transmitting a message, comprising:

determining indication information, wherein when determining to establish a new packet data unit (PDU) session after a user equipment (UE) moves from a first public land mobile network (PLMN) to a second PLMN, and the UE needs to transmit a session management (SM) message in the second PLMN, it is determined, according to the indication information, whether a congestion control back-off timer of the UE in the first PLMN is still valid in the second PLMN; and transmitting the indication information to the UE.

14. The method according to claim 13, wherein the indication information is used for indicating:

whether a PDU session corresponding to a data network name (DNN) is required to be anchored to a home PLMN (HPLMN); and/or, whether single network slice selection assistance information (S-NSSAI) is S-NSSAI of a HPLMN or S-NSSAI of a visiting PLMN (VPLMN).

15. The method according to claim 14, wherein the indication information indicating whether the PDU session corresponding to the DNN is required to be anchored to the HPLMN is transmitted in one of following ways that:

a network side indicates, according to a UE route selection policy (URSP), whether the PDU session corresponding to the DNN is required to be anchored to the HPLMN;

or, indication information of the DNN corresponding to the PDU session is specified when the network side transmits a non-access-stratum (NAS) message to the UE.

16. The method according to claim 15, wherein when the NAS message carries a congestion control back-off timer associated with the DNN, the indication information of the DNN is specified by an access and mobility management function (AMF) for transmitting a downlink NAS TRANSPORT (DL NAS TRANSPORT) message.

17. The method according to claim 15, wherein the indication information of the DNN corresponding to a current PDU session is specified in a PDU session determination process by a session management function (SMF), or, the indication information of the DNN is specified when the congestion control back-off timer associated with the DNN is carried.

18. The method according to claim 16, wherein the congestion control back-off timer associated with the DNN is:

a congestion control back-off timer of the DNN, the S-NSSAI or a [S-NSSAI, DNN] combination for the PDU session corresponding to a current DNN.

19. The method according to claim 14, wherein when the network side specifies a congestion control back-off timer associated with a current S-NSSAI to the UE, it is indicated whether the current S-NSSAI is the S-NSSAI of the HPLMN or the S-NSSAI of the VPLMN accessed at present;

wherein when the NAS message comprises the congestion control back-off timer associated with the S-NSSAI, relevant information of the S-NSSAI is indicated by the AMF for transmitting the DL NAS TRANSPORT message or the SMF for transmitting a SM message.

20. The method according to claim 19, wherein the congestion control back-off timer associated with the S-NSSAI is a congestion control back-off timer of the S-NSSAI or a [S-NSSAI, DNN] combination for a PDU session corresponding to the S-NSSAI.

* * * * *